US011303958B2

(12) United States Patent
Choi et al.

(10) Patent No.: US 11,303,958 B2
(45) Date of Patent: Apr. 12, 2022

(54) DISPLAY DEVICE AND IMAGE DISPLAY METHOD OF THE SAME

(71) Applicant: SAMSUNG ELECTRONICS CO., LTD., Suwon-si (KR)

(72) Inventors: Kilsoo Choi, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/797,843

(22) Filed: Feb. 21, 2020

(65) Prior Publication Data
US 2020/0275155 A1 Aug. 27, 2020

(30) Foreign Application Priority Data
Feb. 22, 2019 (KR) .................. 10-2019-0021434

(51) Int. Cl.
H04N 21/4402 (2011.01)
H04N 21/658 (2011.01)
H04N 21/654 (2011.01)

(52) U.S. Cl.
CPC ... H04N 21/440263 (2013.01); H04N 21/654 (2013.01); H04N 21/6582 (2013.01)

(58) Field of Classification Search
CPC ............ C07K 14/4354; C12N 15/8241; C12N 15/8245; C12N 15/8247; C12N 15/8274;
(Continued)

(56) References Cited

U.S. PATENT DOCUMENTS 6,670,964 B1 12/2003 Ward et al.
2009/0148066 A1 6/2009 Douma et al.
(Continued)

FOREIGN PATENT DOCUMENTS

KR 10-0698301 B1 3/2007
KR 10-1396473 B1 5/2014
(Continued)

OTHER PUBLICATIONS

International Search Report (PCT/ISA/210) and Written Opinion (PCT/ISA/237), issued by the International Searching Authority in International Application No. PCT/KR2020/002563, dated Jun. 2, 2020.
(Continued)

Primary Examiner — Rong Le
(74) Attorney, Agent, or Firm — Sughrue Mion, PLLC

(57) ABSTRACT

Provided is a method of displaying an image in a display device, the method including transmitting, to a content providing device, image request information requesting the content providing device to selectively transmit an image of a first resolution or an image of a second resolution; receiving the image of the first resolution or the image of the second resolution which is obtained by performing upscaling on the image of the first resolution using a first upscaler, based on the image request information; based on receiving the image of the first resolution, performing upscaling on the image of the first resolution using a second upscaler of the display device to obtain a upscaled image having the second resolution and displaying the upscaled image having the second resolution, upscaling capability of the second upscaler being different from upscaling capability of the first upscaler; and based on receiving the image of the second resolution, displaying the image of the second resolution.

16 Claims, 16 Drawing Sheets

(58) Field of Classification Search
CPC ............ C12N 15/8279; C12N 15/8285; Y02A
40/146; Y02A 40/164; G06F 3/147; G06T
3/4092; G09G 2340/0407; G09G
2370/022; G09G 2370/042; G09G
2370/047; G09G 2370/12; G09G 5/005;
G09G 5/391; H04N 21/440263; H04N
21/440272; H04N 21/654; H04N 21/6582
See application file for complete search history.

(56) References Cited

U.S. PATENT DOCUMENTS

| | | | | |
|---|---|---|---|---|
| 2009/0153734 A1* | 6/2009 | Glen | ................... | H04N 21/426 |
| | | | | 348/552 |
| 2012/0254913 A1* | 10/2012 | Di Mattia | ........ | H04N 21/44016 |
| | | | | 725/34 |
| 2014/0211861 A1* | 7/2014 | Lee | ........................ | H04N 19/33 |
| | | | | 375/240.27 |
| 2014/0289787 A1* | 9/2014 | Minemura | ......... | H04N 21/4126 |
| | | | | 725/116 |
| 2017/0115740 A1 | 4/2017 | Kim et al. | | |
| 2018/0108114 A1 | 4/2018 | Boshra-Riad | | |
| 2018/0192042 A1* | 7/2018 | Stolzberg | ................. | G09G 5/12 |
| 2018/0286355 A1 | 10/2018 | Kim et al. | | |
| 2018/0338159 A1 | 11/2018 | Kapoor et al. | | |

FOREIGN PATENT DOCUMENTS

| | | |
|---|---|---|
| KR | 10-1728076 B1 | 4/2017 |
| KR | 10-2018-0126362 A | 11/2018 |
| WO | 2015/190877 A1 | 12/2015 |
| WO | 2019/009922 A1 | 1/2019 |

OTHER PUBLICATIONS

Communication dated Jun. 16, 2020, issued by the Korean Intellectual Property Office in Korean Application No. 10-2019-0021434.

Communication dated Jul. 20, 2020, from the European Patent Office in European Application No. 20158893.6.

* cited by examiner

DISPLAY DEVICE AND IMAGE DISPLAY METHOD OF THE SAME

CROSS-REFERENCE TO RELATED APPLICATION(S)

This application is based on and claims priority under 35 U.S.C. § 119 to Korean Patent Application No. 10-2019-0021434, filed on Feb. 22, 2019, in the Korean Intellectual Property Office, the disclosure of which is incorporated by reference herein in its entirety.

BACKGROUND

1. Field

The disclosure relates to a display device and an image display method of the display device, and more particularly, to an image display method of displaying an image provided from a content providing device connected with a display device through communication.

2. Description of Related Art

Display devices have functions of displaying images that users may view and watch. The users may watch broadcast contents through the display devices. The display device displays broadcasts selected by the user from broadcast signals transmitted from one or more broadcasting stations.

Moreover, in addition to broadcasting functions, smart televisions (TVs) provide a variety of contents and functions. For example, smart TVs may analyze and provide, in advance, features or services based on user's characteristic, instead of operating passively in response to selection of the user.

Also, when a content providing device, such as a set-top box, a Blue-ray disc player, a digital versatile disc player, a streaming device, a home theater, an audio device, etc., is connected with a display device, such as a TV, through wired or wireless communication, the display device may receive an image from the content providing device and display the image.

Recently, content providing devices have been configured to provide an image to a display device at a higher resolution of an original image based on an output resolution of the display device. For example, when the output resolution of the display device is 4K and the resolution of the original image is 2K, the content providing device may upscale the resolution of the original image to 4K and provide an up-scaled image with the up-scaled resolution to the display device.

In general, an upscaling process may be performed by a content providing device, such that the content providing device may upscale the original image based on an output resolution of the display device and the upscaling image resulting from upscaling processing is provided to the display device.

However, as capabilities of the display device are continuously developing and complex support for various functions become possible, the display device may support upscaling with respect to the image. In this case, although an upscaling function of the display device is superior to an upscaling function of the content providing device, the content providing device may upscale the image by default and provide an upscaling image to the display device.

SUMMARY

Accordingly, the disclosure provides a method and apparatus for upscaling an image based on capabilities of an upscaling supported by a display device and capabilities of an upscaling supported by a content providing device.

Additional aspects of the disclosure will be set forth in part in the following description and, in part, will be apparent from the description, or may be learned by practice of the disclosure.

According to an embodiment, there is provided a method of displaying an image in a display device, the method including: transmitting, to a content providing device, image request information requesting the content providing device to selectively transmit image of a first resolution or image of a second resolution; receiving the image of the first resolution or the image of the second resolution which is obtained by performing upscaling on the image of the first resolution using a first upscaler, based on the image request information; based on receiving the image of the first resolution, performing upscaling on the image of the first resolution using a second upscaler of the display device to obtain a upscaled image having the second resolution and displaying the upscaled image having the second resolution, upscaling capability of the second upscaler being different from upscaling capability of the first upscaler; and based on receiving the image of the second resolution, displaying the image of the second resolution.

The method further includes receiving information of the first upscaler from the content providing device, and the transmitting of the image request information to the content providing device further includes transmitting the image request information to the content providing device, based on information of the first upscaler and information of the second upscaler.

The transmitting of the image request information to the content providing device, based on the information of the first upscaler and the information of the second upscaler, further includes, based on determining that the upscaling capability of the second upscaler are superior to the upscaling capability of the first upscaler, transmitting, to the content providing device, the image request information requesting the image of the first resolution; and based on determining that the upscaling capability of the first upscaler are superior to the upscaling capability of the second upscaler, transmitting, to the content providing device, the image request information requesting the image of the second resolution.

The information of the first upscaler and the information of the second upscaler include at least one of identification information and capability information.

The method further includes transmitting the identification information of the first upscaler to an external server; and receiving capability information of the first upscaler from the external server, wherein the transmitting of the image request information to the content providing device includes transmitting the image request information based on the received capability information of the first upscaler and capability information of the second upscaler.

The method further includes determining whether a received image is the image of the first resolution or the image of the second resolution based on at least one of attribute information of the received image, the attribute information comprising a volume of the received image, a resolution of the received image, and an additional information of the received image.

The transmitting of the image request information to the content providing device further includes receiving, from the content providing device, upscaling determination information determining whether the image of the first resolution is required; and based on the received upscaling determination information, transmitting, to the content providing device, the image request information requesting the image of the first resolution.

The method further includes, based on receiving the image of the first resolution, performing a quality processing on the image of the first resolution.

At least one of the first upscaler and the second upscaler performs upscaling on the image of the first resolution by using an artificial intelligence (AI) algorithm based on a neural network.

The transmitting of the image request information to the content providing device further includes transmitting the image request information included in extended display identification data (EDID) data that is image standard data, to the content providing device.

According to another embodiment, there is provided a display device including a communication circuit; a display; a memory storing one or more instructions; and a processor configured to execute the one or more instructions to: control the communication circuit to transmit, to a content providing device, image request information requesting the content providing device to selectively transmit an image of a first resolution or an image of a second resolution; control the communication circuit to receive, from the content providing device, the image of the first resolution or the image of the second resolution which is obtained by performing upscaling on the image of the first resolution using a first upscaler; based on receiving the image of the first resolution, perform upscaling on the image of the first resolution using a second upscaler of the display device to obtain a upscaled image having the second resolution and display the upscaled image having the second resolution, upscaling capability of the second upscaler being different from upscaling capability of the first upscaler; and based on receiving the image of the second resolution, display the image of the second resolution.

The processor is further configured to execute the one or more instructions to: control the communication circuit to receive information of the first upscaler from the content providing device; and control the communication circuit to transmit the image request information to the content providing device, based on information of the first upscaler and information of the second upscaler.

The processor is further configured to execute the one or more instructions to: based on determining that the upscaling capability of the second upscaler are superior to the upscaling capability of the first upscaler, control the communication circuit to transmit, to the content providing device, the image request information requesting the image of the first resolution; and based on determining that the upscaling capability of the first upscaler are superior to the upscaling capability of the second upscaler, control the communication circuit to transmit, to the content providing device, the image request information requesting the image of the second resolution.

The information of the first upscaler or the information of the second upscaler includes at least one of identification information and capability information.

The processor is further configured to execute the one or more instructions to control the communication circuit to transmit identification information of the first upscaler to an external server; control the communication circuit to receive capability information of the first upscaler from the external server; and control the communication circuit to transmit the image request information to the content providing device, based on the received capability information of the first upscaler and capability information of the second upscaler.

The processor is further configured to execute the one or more instructions to determine whether a received image is the image of the first resolution or the image of the second resolution based on at least one of attribute information of the received image, and the attribute information includes a volume of the received image, a resolution of the received image, and additional information of the received image.

The processor is further configured to execute the one or more instructions to receive, from the content providing device, upscaling determination information determining whether the image of the first resolution is required; and based on the received upscaling determination information, control the communication circuit to transmit, to the content providing device, the image request information requesting the image of the first resolution.

At least one of the first upscaler and the second upscaler performs upscaling with respect to the image of the first resolution by using an artificial intelligence (AI) algorithm based on a neural network.

The processor is further configured to execute the one or more instructions to control the communication circuit to transmit the image request information included in extended display identification data (EDID) data that is image standard data, to the content providing device.

According to another embodiment, there is provided a computer program product including a non-transitory computer-readable recording medium having a program stored thereon to perform an operation method of a display device, the operation method comprising: transmitting, to a content providing device, image request information requesting the content providing device to selectively transmit image of a first resolution or image of a second resolution; receiving the image of the first resolution or the image of the second resolution which is obtained by performing upscaling on the image of the first resolution using a first upscaler, based on the image request information; based on receiving the image of the first resolution, performing upscaling on the image of the first resolution using a second upscaler of the display device to obtain a upscaled image having the second resolution and displaying the upscaled image having the second resolution, upscaling capability of the second upscaler being different from upscaling capability of the first upscaler; and based on receiving the image of the second resolution, displaying the image of the second resolution.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
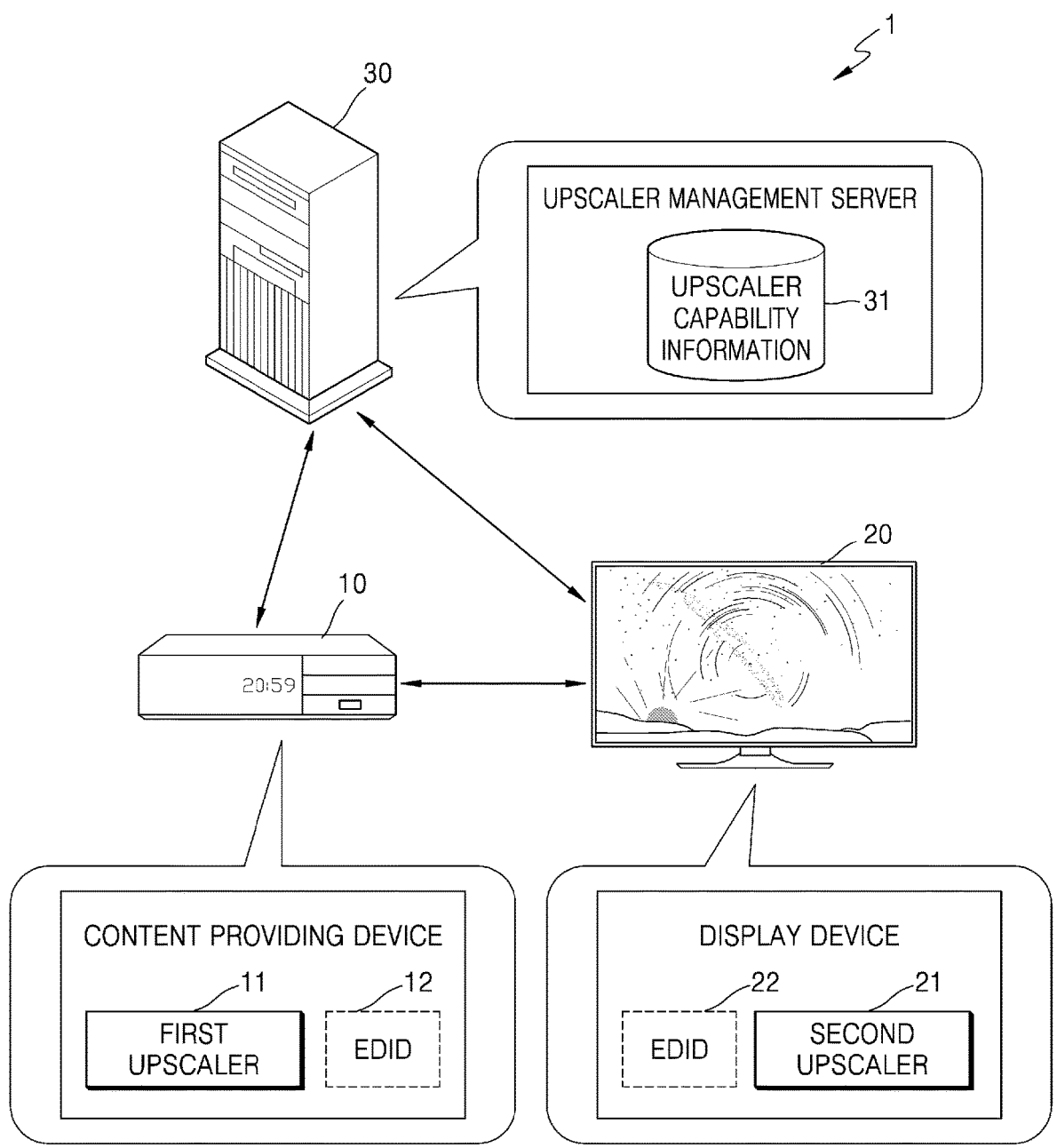
FIG. 1 schematically illustrates a system according to an embodiment.

Terms used herein will be briefly described.

Although terms used herein are terms generally associated with functions in the disclosure, the terms may vary according to the intention of those of ordinary skill in the art, judicial precedents, or introduction of new technology. In addition, in certain cases, the meaning of the terms may be disclosed in a corresponding description of the disclosure. Thus, the terms should not be strictly defined by generally known meaning of the terms, but by the meaning of the terms in the context of the disclosure.

Throughout the disclosure, the term 'include' means that a corresponding component may further include other components unless the context clearly states otherwise. The terms such as "unit" or "module" indicates a unit for processing at least one function or operation, and may be implemented in hardware, software, or in a combination of hardware and software.

Hereinafter, embodiments will be described in detail with reference to the accompanying drawings to allow those of ordinary skill in the art to reasonably understand and enable the embodiments. However, the disclosure may be implemented in various forms, and are not limited to the embodiments described herein. To clearly describe the disclosure, parts that are not associated with the description have been omitted, and identical reference numerals refer to identical parts.

The term "user" may refer to a viewer of an image displayed on a display device or a content display device or a person who may control a function or operation of the display device.

The expression "at least one of a, b or c" may indicate only a, only b, only c, both a and b, both a and c, both b and c, all of a, b, and c, or variations thereof.

FIG. 1 schematically illustrates a system according to an embodiment.

In FIG. 1, a system 1 may include a display device 20, a content providing device 10, and an upscaler management server 30 according to an embodiment.

The display device 20 may be, but not limited to, a television (TV), and may be implemented in various forms including a display. For example, the display device 20 may be implemented with various electronic devices such as a cellular phone, a tablet personal computer (PC), a digital camera, a camcorder, a laptop computer, a desktop, an electronic (e)-book terminal, a digital broadcasting terminal, a personal digital assistant (PDA), a portable multimedia player (PMP), a navigator, an MP3 player, a wearable device, and so forth. In particular, embodiments may be easily implemented in, but not limited to, a display device having a large-size display such as a TV.

The display device 20 may be of a fixed type or a mobile type, and may be a digital broadcasting receiver capable of receiving digital broadcasting. The display device 20 may be implemented with not only a flat display device, but also a curved display device provided with a screen having a curvature or a flexible display device having an adjustable curvature. An output resolution of the display device 20 may include, for example, high definition (HD), full HD, ultra HD, or a higher resolution.

The content providing device 10 may provide contents. For example, the content providing device 10 may include a set-top box, a Blue ray disk player, a digital versatile disk (DVD) player, a streaming device, a home theater, an audio device, etc. The content providing device 10 may include various devices such as a smart phone, a tablet personal computer (PC), a mobile phone, a video phone, an electronic book (e-book) reader, a desktop PC, a laptop PC, a netbook PC, a personal digital assistant (PDA), a portable multimedia player (PMP), an MP3 player, a wearable device, or the like.

The display device 20 and the content providing device 10 may transmit and receive data, a signal, etc., by using wired or wireless communication. For example, the content providing device 10 may transmit an image signal to the display device 20 that may then display an image based on the received image signal.

The display device 20 and the content providing device 10 may obtain their device information by using wired or wireless communication.

For example, when the display device 20 and the content providing device 10 are connected with each other by communication, the content providing device 10 may access an extended display identification data (EDID) storage 22 (e.g., an EDID read only memory (ROM)) of the display device 20 and obtain EDID data recorded in the EDID storage 22. Alternatively, when the content providing device 10 transmits a request for EDID data to the display device 20, the display device 20 may provide the EDID data of the EDID storage 22 to the content providing device 10 in response to the request.

In another example, when the display device 20 and the content providing device 10 are connected with each other by communication, the display device 20 may access an EDID storage 12 (e.g., an EDID ROM) of the content providing device 10 and obtain EDID data recorded in the EDID storage 12. Alternatively, when the display device 20 transmits a request for EDID data to the content providing device 10, the content providing device 10 may provide the EDID data of the EDID storage 12 to the display device 20 in response to the request.

The EDID data may include items such as a name, an identification (ID), a model name, a manufacturing date, a serial number, a maximum display size of an image, an aspect ratio, a horizontal frequency, a vertical frequency, a maximum resolution, gamma, display power management signaling (DPMS) mode support, a supportable image mode, a manufacturer, etc. of a device, and may further include additional information depending on a need. For example, the EDID data may further include information of an upscaler, information of a dominant upscaler, image request information, image type information, etc.

The display device 20 and the content providing device 10 may each include an upscaler that performs upscaling on the original image. For convenience, the upscaler provided by the content providing device 10 will be referred to as a first upscaler 11 and the upscaler provided by the display device 20 will be referred to as a second upscaler 21. An image resulting from upscaling using the first upscaler 11 will be referred to as a first upscaling image, and an image resulting from upscaling using the second upscaler 21 will be referred to as a second upscaling image.

The term "original image" is used to distinguish an image from an upscaling image resulting from upscaling, and may also mean an image that has not been performed an upscaling by the first upscaler 11 or the second upscaler 21. For example, the original image may include a decoded image.

The upscaler may, for example, upscale a 2K image to a 4K image or a 4K image to an 8K image. The upscaler may upscale an image, for example, by using an artificial intelligence (AI) algorithm. Specifically, in upscaling from the 2K image to the 4K image, image information corresponding to a resolution of 1920×1080×3 needs to be additionally generated, but in upscaling from the 4K image to the 8 K image, an image corresponding to a resolution of 3840× 2160×3 may need to be further generated. Thus, as the resolution of the image increases, a tendency to image upscaling using an AI algorithm increases.

The upscaler may upscale an image, for example, by using a learning network model. The learning network model may include, for example, a plurality of network nodes having weight values. The learning network model may include, for example, a neural network model, a deep learning model evolving from the neural network model, or a narrow learning model. In the neural model, a plurality of network nodes may be located at different depths (or layers) and may transmit and receive data according to a convolution connection relationship. For example, a model such as, but not limited to, a deep neural network (DNN), a recurrent neural network (RNN), a bidirectional recurrent deep neural network (BRDNN), or the like may be used as a learning network model.

The upscaler may be manufactured in the form of a dedicated hardware chip for AI or may be a part of a general-purpose processor (e.g., a central processing unit (CPU) or an application processor) or a graphic processor (e.g., a graphics processing unit (GPU)).

The upscaler management server 30 may include one or more sub servers or may be configured in the form of a cloud server. The upscaler management server 30 may communicate with the content providing device 10 or the display device 20 and provide capability information, like upscaling, superior upscaling information, and so forth. The upscaler management server 30 may store upscaler capability information 31. The upscaler capability information 31 may include, for example, capability index information per type of an upscaler. The capability index information may include, for example, a score, a version, a ranking, or rating per type of an upscaler.

Upsclalers which upscale images with a first resolution to images with a second resolution may output upscaling images with different quality depending on upscaling capability of the upscalers. The upscaling capability of the upscalers may comprise upscaling performance index.

Figure 16:
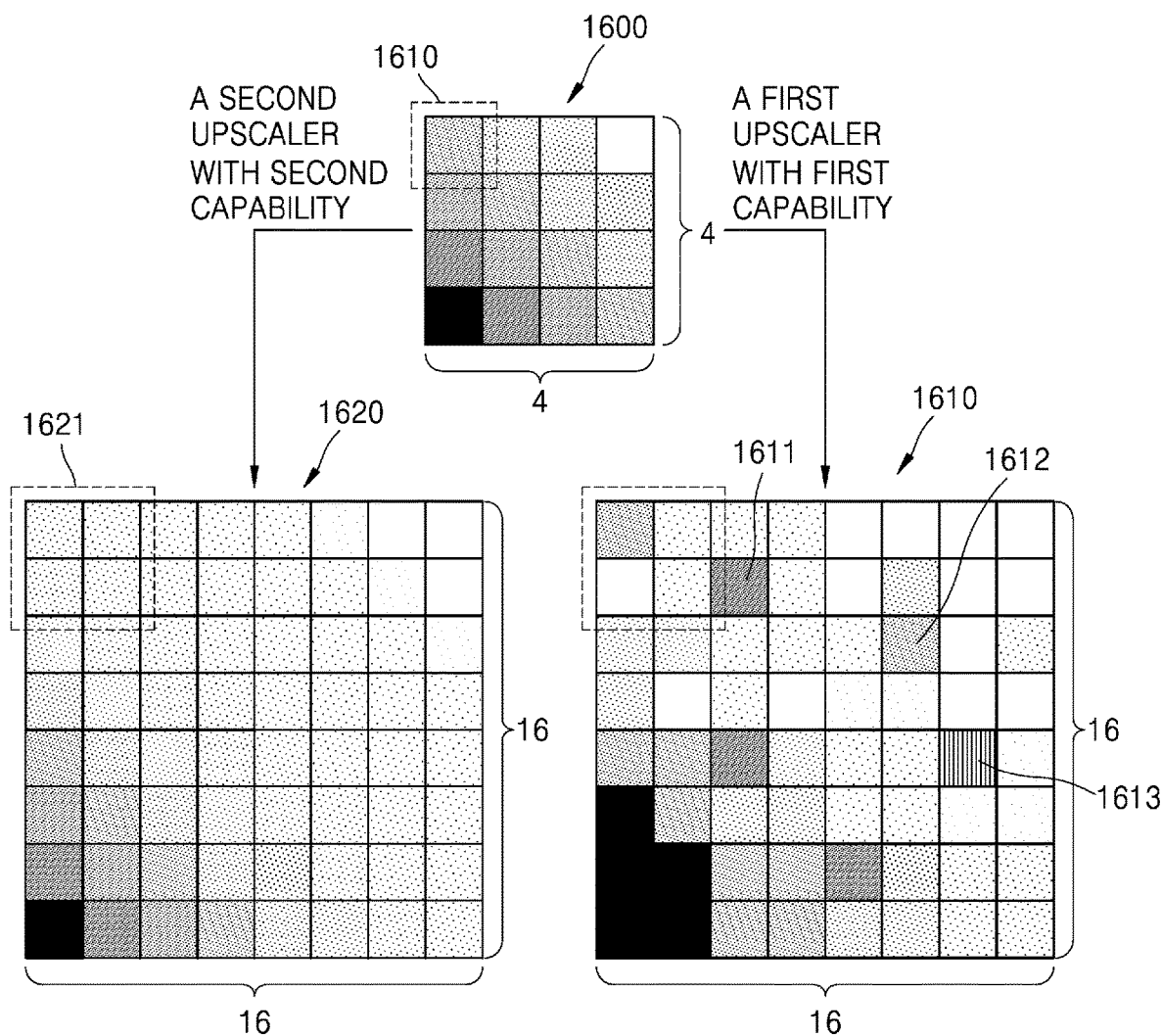
FIG. 16 is a reference diagram to describe the pixel conversion according to the one example of upscaling.

FIG. 16 is a reference diagram to describe the pixel conversion according to the one example of upscaling.

Referring to FIG. 16, for example, in the case of upscaling converting original image 1600 with 4×4 pixels into an image with 16×16 pixels, one pixel 1610 can be matched with four pixels 1621. At this point, since the original image 1600 has 16 pixel information and 256 pixels exist in the image converted by upscaling, the upscaler eventually obtains 256 pixel information through the process of analyzing and processing the existing 16 pixel information. Ultimately, the upscaler may use the known 16 pixel information to find 256−16=240 unknown pixel values. Depending on the performance of the upscaler, the 240 known pixel values can be properly generated and located and the final image is naturally presented, or the 240 known pixel values cannot be properly generated and located and the final image may not be naturally presented. Referring to FIG. 16, image 1620 obtained by upscaling the original image 1600 by a second upscaler with a second performance looks natural by proper pixel information. Image 1610 obtained by upscaling the original image 1600 by a first upscaler with a first performance looks not natural because several pixel 1611, 1612, and 1613 have inappropriate values.

Even in the case of upscaling the original images to the same resolution, the upscaled images can have various quality because of various factors, such as artificial intelligence algorithms used by each upscaler. Thus, according to the examples disclosed in this disclosure, the display device may perform operations to upscale images using a upscaler having a superior capability among a variety of upscalers.

The display device 20 may include a communication circuit, a display, a memory, and a processor. The communication circuit, the display, the memory, and the processor will be described in detail with reference to FIG. 15.

According to an embodiment, the processor of the display device 20 may control the communication circuit to set up communication connection with the content providing device 10. The processor of the display device 20 may control the communication circuit to transmit, to the content providing device 10, image request information for requesting the content providing device 10 to selectively transmit an original image or an upscaling image. The processor of the display device 20 may control the communication circuit to receive the original image or a first upscaling image resulting from an upscaling performed by the first upscaler 11 from the content providing device 10 based on the image request information. Upon receiving the original image, the processor of the display device 20 may perform upscaling on the original image by using the second upscaler 21, and control the display of the display device 20 to display a second upscaling image resulting from upscaling. Upon receiving the first upscaling image, the processor of the display device 20 may skip upscaling using the second upscaler 21 with respect to the first upscaling image, and control the display of the display device 20 to display the first upscaling image.

According to an embodiment, the processor of the display device 20 may control the communication circuit to receive information of the first upscaler 11 from the content providing device 10 and control the communication circuit to transmit the image request information to the content providing device 10 based on information of the first upscaler 11 and information of the second upscaler 21.

Furthermore, based on determining that capabilities of the first upscaler 11 are superior to those of the second upscaler 21, the processor of the display device 20 may control the communication circuit to transmit to the content providing device 10, the image request information for requesting transmission of the original image, and based on determining that the capabilities of the second upscaler 21 are superior to those of the first upscaler 11, the processor of the display device 20 may control the communication circuit to transmit to the content providing device 10, the image request information for requesting transmission of the first upscaling image.

The information of the first upscaler or the information of the second upscaler may include identification information and capability information of the first and/or second upscaler.

The processor of the display device 20 may control the communication circuit to transmit identification information of the first upscaler 11 to the upscaler management server 30, control the communication circuit to receive the capability information of the first upscaler 11 from the upscaler management server 30 based on the transmission, and control the communication circuit to transmit the image request or related information to the content providing device 10 based on the received capability information of the first upscaler 11 and the capability information of the second upscaler 21.

The processor of the display device 20 may determine whether a received image is the original image or the first upscaling image, based on at least one of attribute information of the received image, a volume of the received image, a resolution of the received image, or additional information of the received image of the image request information.

According to an embodiment, as receiving, from the content providing device 10, upscaling determination information for determining whether the original image is needed, the processor of the display device 20 may control the communication circuit to transmit to the content providing device 10, image request information for requesting transmission of the original image.

According to an embodiment, at least one of the first upscaler 11 and the second upscaler 21 may be an upscaler that upscales the original image by using an AI algorithm based on a neural network.

According to an embodiment, the processor of the display device 20 may control the communication circuit to transmit image request information included in EDID data that is image standard data to the content providing device 10.

Figure 2:
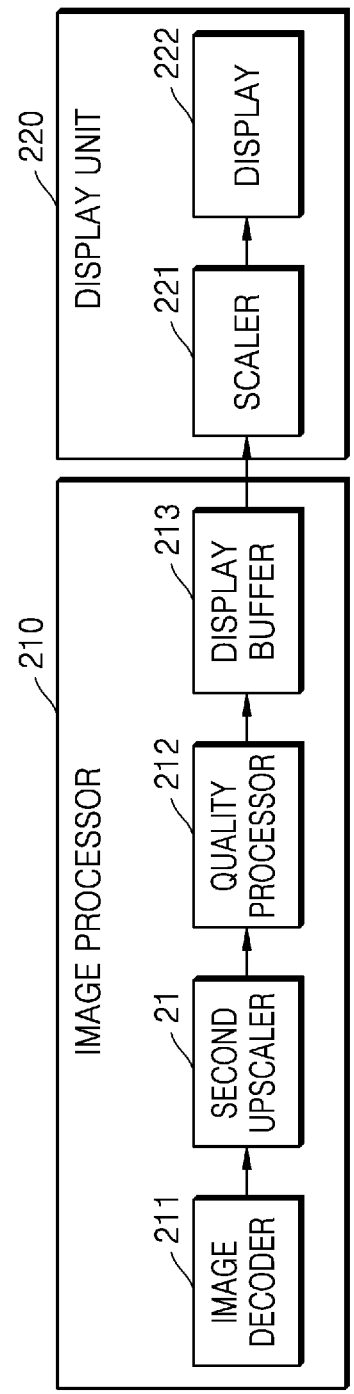
FIG. 2 is a block diagram of a partial structure of a display device, according to an embodiment.

FIG. 2 is a block diagram of a partial structure of a display device, according to an embodiment.

Referring to FIG. 2, the display device 20 may include an image processor 210 and a display unit 220.

The image processor 210 may include an image decoder 211, a second upscaler 21, a quality processor 212, and a display buffer 213.

The image decoder 211 may perform decoding on an image received from the content providing device 10 or an image stored in the display device 20. The decoded image may be expressed, for example, as a YUV color space. The image decoder 211 may include a decoder having various standards.

The second upscaler 21 may perform upscaling on an input image. The second upscaler 21 may receive, for example, a 4K image, perform upscaling on the 4K image using a neural network algorithm, and output the second upscaling image resulting from upscaling.

The quality processor 212 may perform quality processing on the input image. For example, the quality processor 212 may optimize color impression by improving a contrast ratio and colors of the input image. Alternatively, the quality processor 212 may optimize the quality by performing gamma correction on the input image. The quality processor 212 may improve sharpness of the image by sharpening an edge part included in the image. The quality processor 212 may adjust the resolution of the image or perform anti-aliasing to alleviate jagging occurring in the image.

The display buffer 213 may provide the processed or upscaled input image to the display unit 220. The display buffer 213 may store an image corresponding to one screen and provide the image as a bitstream to the display unit 220.

The display unit 220 may include a scaler 221 and a display (or a display panel) 222. The scaler 221 may modify the input image. For example, the scaler 221 may enlarge or reduce the input image, considering size/form of the display or size/form of the screen.

As described, the display device 20 may receive the original image or the first upscaling image from the content providing device 10. The first upscaling image may be an image resulting from upscaling using the first upscaler 11 provided by the content providing device 10.

Upon receiving the original image from the content providing device 10, the display device 20 may perform upscaling on the original image in the second upscaler 21 and provide the second upscaling image to the display unit 220 via the quality processor 212 and the display buffer 213. On the other hand, the display device 20 may skip (or bypass) upscaling using the second upscaler 21 and quality processing using the quality processor 212 with respect to the first upscaling image, and provide the first upscaling image to the display unit 220 via the display buffer 213.

Alternatively, upon receiving the first upscaling image from the content providing device 10, the display device 20 may skip (or bypass) upscaling using the second upscaler 21 with respect to the first upscaling image, and provide the first upscaling image to the display unit 220 via the quality processor 212 and the display buffer 213.

According to an embodiment, based on receiving an input of a stream signal through a demultiplexer, the stream signal may be input to the image decoder 211 and decoded, and may be provided to the display unit 220 via the second upscaler 21, the quality processor 212, and the display buffer 213.

Figure 3:
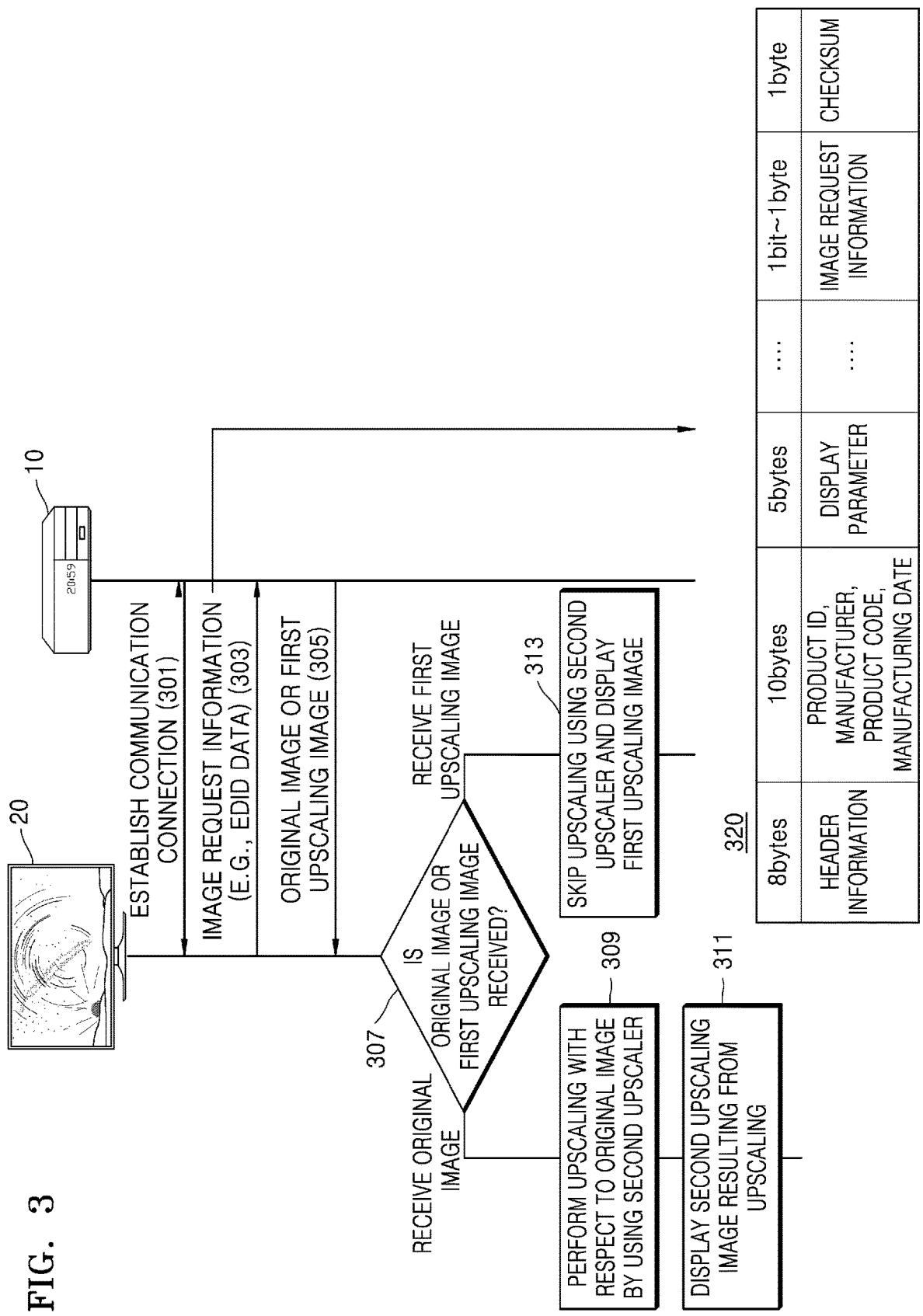
FIG. 3 is a flowchart illustrating an operation of a system according to an embodiment.

FIG. 3 is a flowchart illustrating an operation of a system, according to an embodiment.

In operation 301, a communication connection may be established between the content providing device 10 and the display device 20. The content providing device 10 and the display device 20 may be connected, for example, through a wired/wireless network. For example, the display device 20 and the content providing device 10 may be connected with each other through an HDMI cable. Alternatively, the display device 20 and the content providing device 10 may be connected with each other using wireless communication such as Bluetooth, Bluetooth Low Energy (BLE), Zigbee, Wireless Fidelity (WiFi), etc.

When communication connection is established, in operation 303, the display device 20 may transmit to the content providing device 10, image request information for requesting selective transmission of the original image or the first upscaling image obtained by performing upscaling on the original image. The image request information may be transmitted to the content providing device 10, for example, through EDID data that is image standard data, or through a separate request message.

The EDID data may include various characteristics, environment, or state information of the display device 20. The EDID data may include items such as a name, an ID, a model name, a manufacturing date, a serial number, a maximum display size of an image, an aspect ratio, a horizontal frequency, a vertical frequency, a maximum resolution, gamma, DPMS mode support, a supportable image mode, a manufacturer, etc. of a display device, and any additional information depending on a need.

An example of EDID data 320 is shown in FIG. 3. Here, the EDID data 320 shows an example of EDID data including image request information. The image request information may be included as a new field in the EDID data, or may be included in a reserved field of the EDID data. The size of image request information may range from, for example, 1 bit to 1 byte, and when the image request information is defined as an 1-bit flag field, Flag 0 may indicate a request for a first upscaling image and Flag 1 may indicate a request for the original image, but roles of Flag 0 and Flag 1 may be switched.

The content providing device 10 having received the image request information may transmit the original image or the first upscaling image by upscaling the original image, based on the received image request information.

In operation 307, the display device 20 may determine whether the received image is the original image or the first upscaling image. The display device 20 may include a switch module for determining a type of the received image. The switch module may be implemented with software (S/W) or hardware (H/W).

For example, the display device 20 may determine based on attribute information (e.g., image pattern information, metadata of the image, etc.) of the received image whether the received image is the original image or the first upscaling image.

In another example, the display device 20 may determine based on size information of the received image whether the received image is the original image or the first upscaling image. For example, an image passing through upscaling has a larger volume or a higher resolution than that of the original image, such that the display device 20 may determine that an image having a volume larger than or equal to a specific volume (e.g., 6 megabytes or more per frame) or a resolution higher than or equal to a specific resolution (e.g., 8K or higher) is an image passing through upscaling, and an image having a volume smaller than a specific volume or a resolution lower than a specific resolution is the original image.

In another example, the display device 20 may determine, based on additional information (e.g., header information or flag information) provided together with the received image, whether the received image is the original image or the first upscaling image. For example, Flag 0 may indicate the first upscaling image and Flag 1 may indicate the original image, but the indications of Flag 0 and Flag 1 may be switched.

Alternatively, operation 307 may be omitted. For example, in operation 303, the display device 20 has provided image request information for an image to be received, such that when the display device 20 receives an image from the content providing device 10, the display device 20 may determine that the received image is the image requested through the image request information.

When the image received from the content providing device 10 is the original image, the display device 20 may perform upscaling on the original image by using the second upscaler 21 in operation 309. The display device 20 may further perform quality processing on the original image. For example, the display device 20 may perform upscaling using the second upscaler 21 and quality processing using the quality processor 212 of FIG. 2, on the received original image. Once upscaling is performed on the original image, the display device 20 may display the second upscaling image resulting from upscaling in operation 311.

Alternatively, when the image received from the display device 20 is the first upscaling image, the display device 20 may display the first upscaling image while skipping upscaling using the second upscaler 21, in operation 313. For example, the display device 20 may display the received first upscaling image on a display 222 through a display buffer 213 of FIG. 2.

Figure 4:
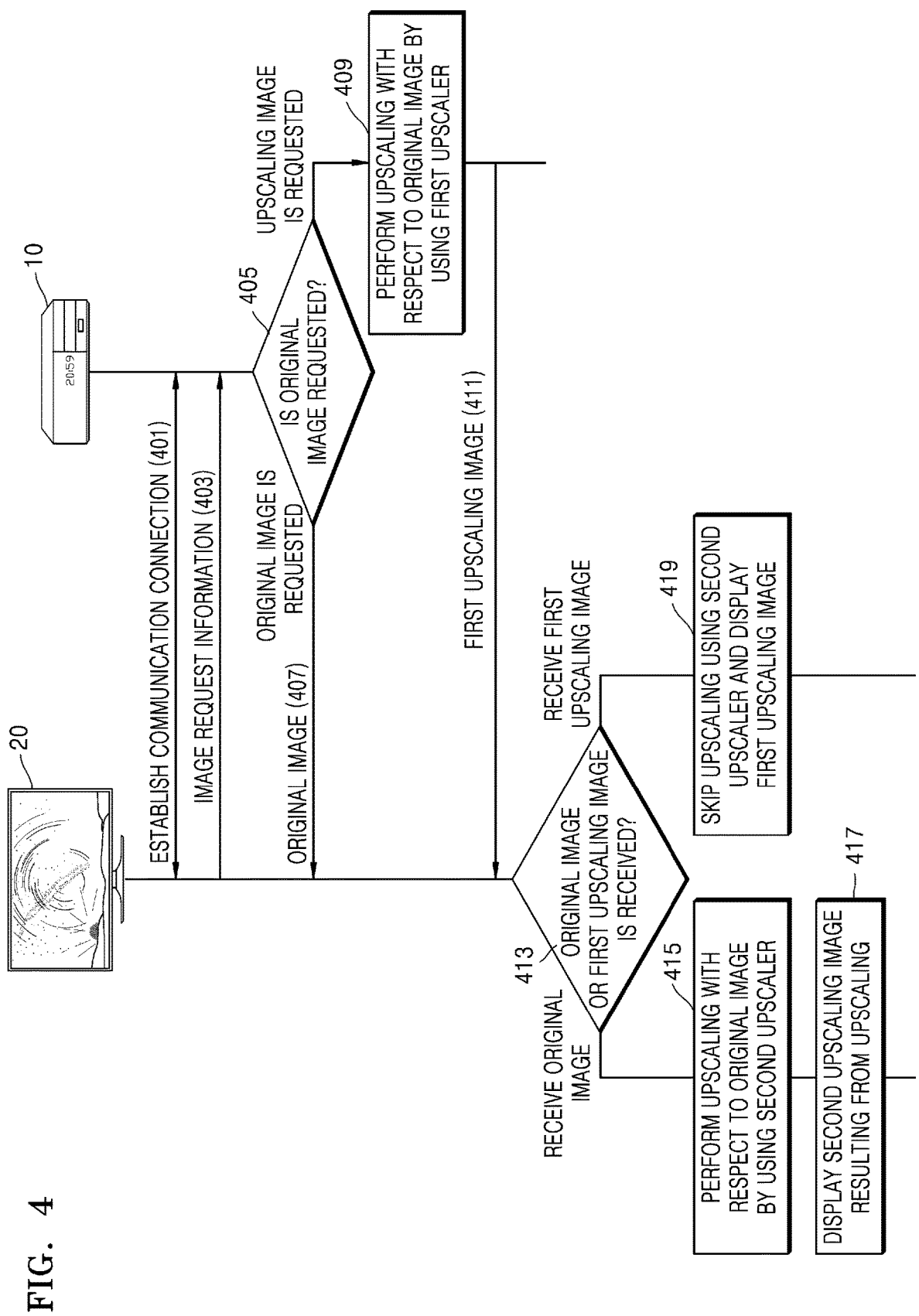
FIG. 4 is a flowchart illustrating an operation of a system according to another embodiment.

FIG. 4 is a flowchart illustrating an operation of a system according to another embodiment.

In FIG. 4, operation 401 of establishing communication connection may correspond to operation 301 of FIG. 3.

In operation 403, the display device 20 may transmit image request information (e.g., EDID data) to the content providing device 10.

In operation 405, the content providing device 10 may determine based on the received image request information whether the display device 20 is requesting the original image or the first upscaling image. For example, when a flag value for requesting the original image is included in the received image request information, the content providing device 10 may determine that the display device 20 is requesting the original image. On the other hand, when a flag value for requesting an upscaling image is included in the received image request information or image standard data (e.g., EDID data) having no image request information, the content providing device 10 may determine that the display device 20 is requesting the upscaling image.

When the display device 20 requests the original image, the content providing device 10 may transmit the original image to the display device 20 and skip upscaling the original image by using the first upscaler 11, in operation 407.

Alternatively, when the display device 20 requests an upscaling image, the content providing device 10 may perform upscaling on the original image by using the first upscaler 11, in operation 409.

Once the first upscaling is performed on the original image by the content providing device 10, the content providing device 10 may transmit the first upscaling image resulting from the first upscaling to the display device 20, in operation 411.

In operations 413 through 419, when the original image is received, the display device 20 may perform upscaling on the original image by using the second upscaler 21 and display the second upscaling image resulting from upscaling. On the other hand, when the first upscaling image is received, the display device 20 may skip upscaling by the second upscaler 21, and display the first upscaling image. Operations 413 through 419 may correspond to operations 307 through 313.

Figure 5:
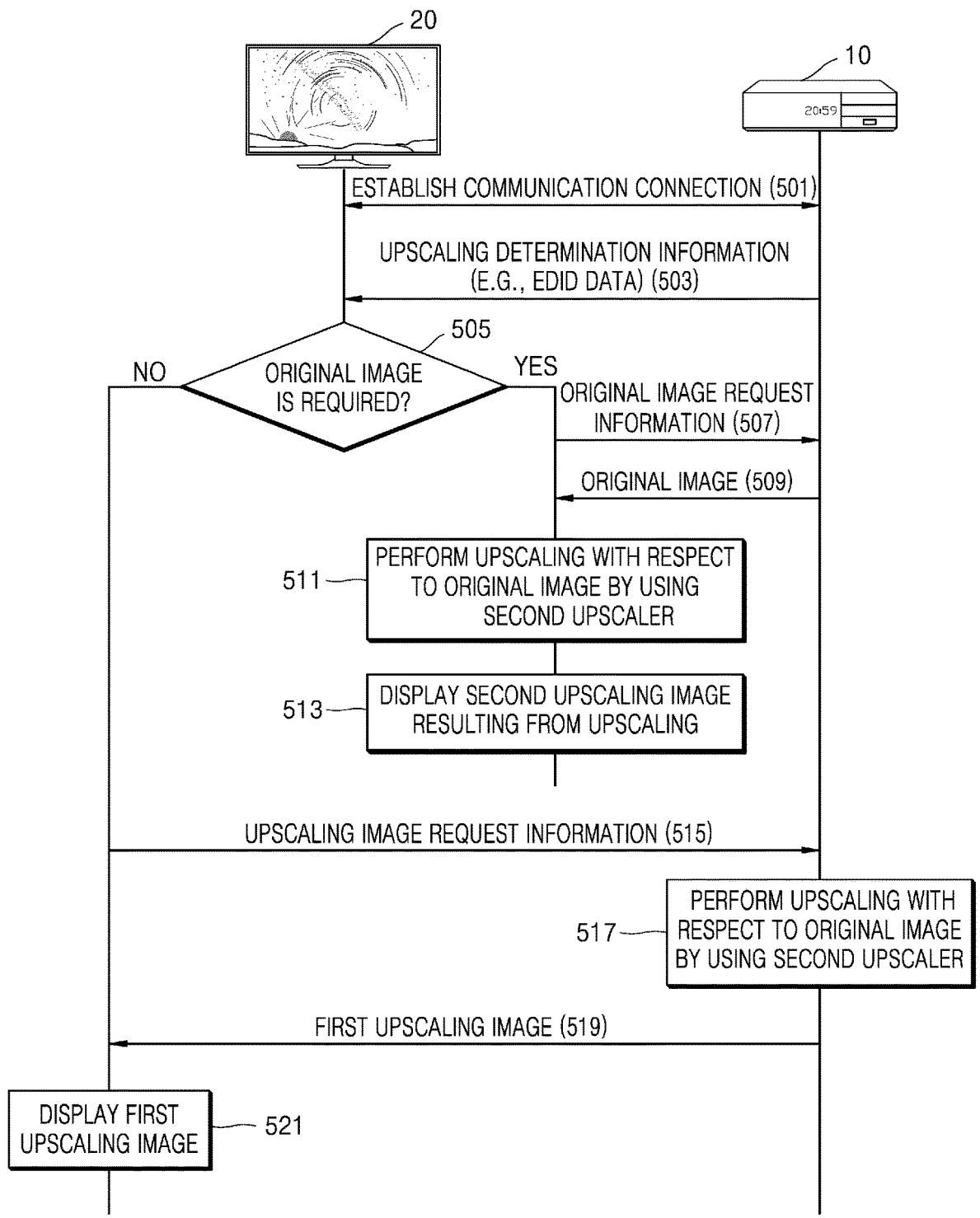
FIG. 5 is a flowchart illustrating an operation of a system according to another embodiment.

FIG. 5 is a flowchart illustrating an operation of a system, according to another embodiment.

In FIG. 5, operation 501 of establishing communication connection may correspond to operation 301 of FIG. 3.

In operation 503, the content providing device 10 may transmit upscaling determination information to the display device 20 for the display device 20 to determine whether an original image is required. The upscaling determination information may be transmitted to the display device 20, for example, through EDID data that is image standard data, or through a separate request message.

When the upscaling determination information is received, the display device 20 may determine whether the original image is required, in operation 505.

According to an embodiment, when the display device 20 determines that the original image is required, the display device 20 may transmit the original image request information to the content providing device 10, in operation 507. In operation 509, the content providing device 10 having received the original image request information may transmit the original image to the display device 20. The content providing device 10 may provide additional information indicating that the image provided by the content providing device 10 is the original image.

In operations 511 and 513, the display device 20 having received the original image may perform upscaling on the original image by using the second upscaler 21 and display the second upscaling image resulting from upscaling.

Alternatively, when the display device 20 determines that the upscaling image is required to be performed by the content providing device 10, the display device 20 may transmit upscaling image request information requesting the upscaling image to the content providing device 10, in operation 515. In operations 517 and 519, the content providing device 10 having received the upscaling image request information may perform upscaling on the original image by using the first upscaler 11 and transmit the first upscaling image to the display device 20. The content providing device 10 may provide additional information indicating that the image provided by the content providing device 10 is the first upscaling image.

In operation 521, the display device 20 having received the first upscaling image may display the received first upscaling image on the display 222 through the display buffer 213 of FIG. 2.

Figure 6:
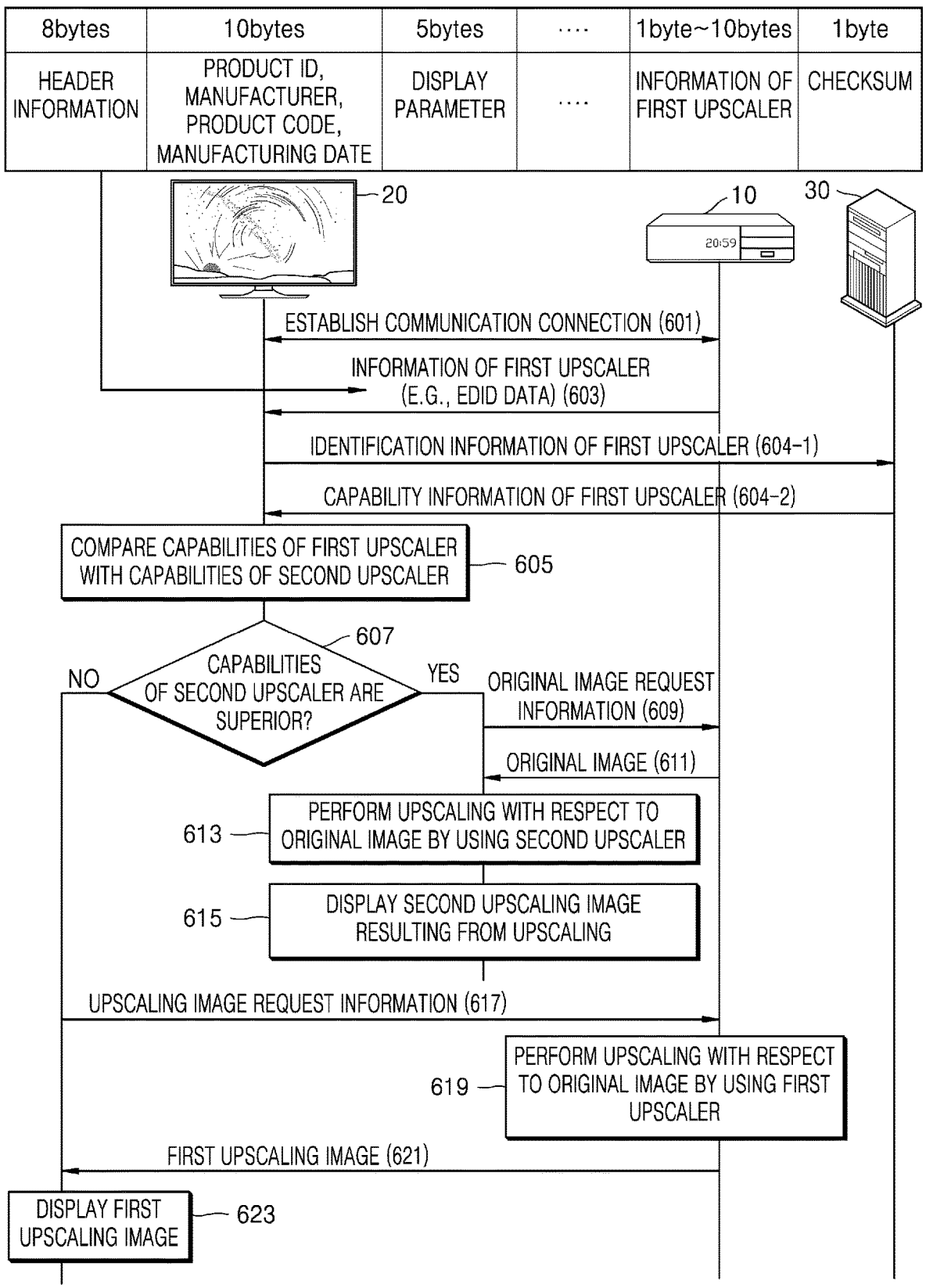
FIG. 6 is a flowchart illustrating an operation of a system according to another embodiment.

FIG. 6 is a flowchart illustrating an operation of a system, according to another embodiment.

In FIG. 6, operation 601 of establishing communication connection may correspond to operation 301 of FIG. 3.

When communication connection is established, the content providing device 10 may transmit information of the first upscaler 11, provided by the content providing device 10, to the display device 20. The information of the first upscaler 11 may include at least one of identification information of the first upscaler 11 and capability information of the first upscaler 11. The identification information of the first upscaler 11 may include a manufacturer, a product code, or version information of the first upscaler 11, and the capability information of the first upscaler 11 may include a capability index of the first upscaler 11.

The information of the first upscaler 11 may be transmitted to the display device 20 through EDID data that is image standard data, or through a separate message.

EDID data 630 of FIG. 6 shows an example of EDID data including the information of the first upscaler 11. The information of the first upscaler 11 may be included as a new field in the EDID data, or may be included in a reserved field of the EDID data. The information of the first upscaler 11 may have, but not limited to, a size of 1 byte through 10 bytes.

When the information of the first upscaler 11 is received, the display device 20 may transmit image request information requesting selective transmission of the original image or an upscaling image to the content providing device 10, based on the information of the first upscaler 11 provided by the content providing device 10 and the information of the second upscaler 21 provided by the display device 20.

More specifically, in operation 605, the display device 20 may compare capabilities of the first upscaler 11 with capabilities of the second upscaler 21. The capabilities of the upscalers may comprise upscaling performance index.

As a comparison result, when the display device 20 determines that the capabilities of the second upscaler 21 are superior to the capabilities of the first upscaler 11 in operation 607, the display device 20 may receive the original image from the content providing device 10 to perform upscaling on the original image by using the second upscaler 21, and display the second upscaling image resulting from upscaling in operations 609 through 615. These operations may correspond to operations 507 through 513.

On the other hand, when the display device 20 determines that the capabilities of the first upscaler 11 are superior to the capabilities of the second upscaler 21 in operation 607, the display device 20 may receive the first upscaling image resulting from upscaling from the content providing device 10 and display the first upscaling image in operations 617 through 623. Specifically, the display device 20 may transmit upscaling image request information to the content providing device 10 to request the content providing device 10 to perform upscaling. Based on receiving the request from the display device 20, the content providing device 10 may perform the upscaling by using the first upscaler 11 that is superior to that of the upscaler 21 in the display device 20, and transmit the first upscaling image back to the display device 20. These operations may correspond to operations 515 through 521.

Furthermore, when the display device 20 receives the identification information of the first upscaler 11 in operation 603 of FIG. 6, the display device 20 may transmit the identification information of the first upscaler 11 to the upscaler management server 30 in operation 604-1. The upscaler management server 30 may search for the capability information of the first upscaler 11, based on the identification information of the first upscaler 11. In operation 604-2, the upscaler management server 30 may transmit the capability information of the first upscaler 11 corresponding to the identification information of the first upscaler 11 to the display device 20. Accordingly, in operations 605 and 607, the display device 20 may compare the received capability information of the first upscaler 11 with previously stored capability information of the second upscaler 21 in the display device 20, to determine an upscaler having superior capabilities.

In another embodiment, when the display device 20 receives the identification information of the first upscaler 11 in operation 603 of FIG. 6, the display device 20 may transmit the identification information of the first upscaler 11 and the identification information of the second upscaler 21 to the upscaler management server 30. The upscaler management server 30 may search for the capability information of the first upscaler 11 and the capability information of the second upscaler 21 and transmit respective capability information to the display device 20, based on the identification information of the first upscaler 11 and the identification information of the second upscaler 21. Accordingly, in operations 605 and 607, the display device 20 may compare the received capability information of the first upscaler 11 with the capability information of the second upscaler 21 to determine an upscaler having superior capabilities.

Figure 7:
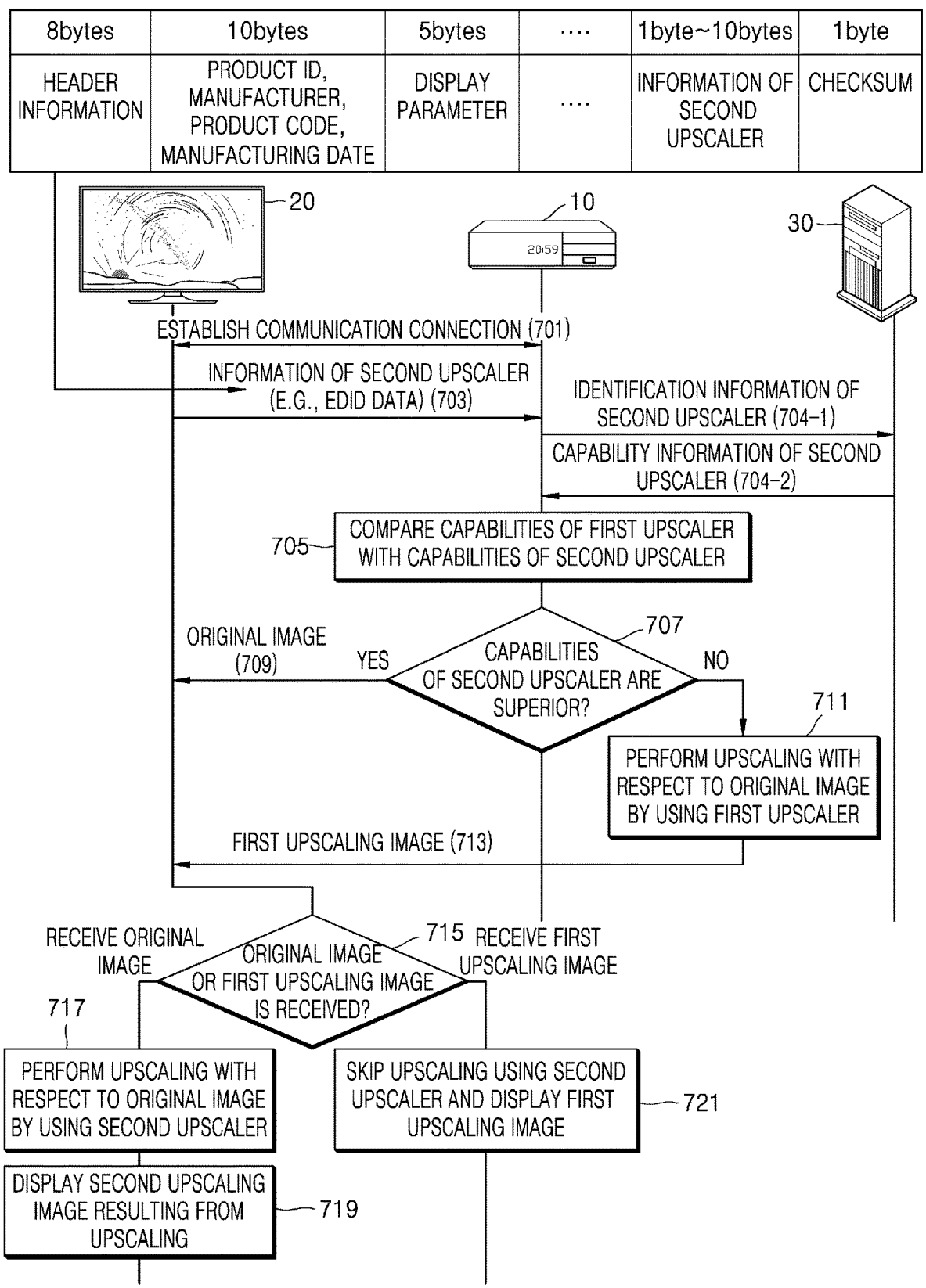
FIG. 7 is a flowchart illustrating an operation of a system according to another embodiment.

FIG. 7 is a flowchart illustrating an operation of a system, according to another embodiment.

In FIG. 7, operation 701 of establishing communication connection may correspond to operation 301 of FIG. 3.

When communication connection is established, in operation 703, the display device 20 may transmit information of the second upscaler 21, provided by the display device 20, to the content providing device 10. The information of the second upscaler 21 may include at least one of the identification information of the second upscaler 21 and the capability information of the second upscaler 21. The identification information of the second upscaler 21 may include a manufacturer, a product code, or version information of the second upscaler 21, the capability information of the second upscaler 21, and a capability index of the second upscaler 21.

The information of the second upscaler 21 may be transmitted to the content providing device 10 through EDID data that is image standard data, or to the display device 20 through a separate message.

The EDID data 730 of FIG. 7 shows an example of EDID data including the information of the second upscaler 21. The information of the second upscaler 21 may be included as a new field in the EDID data, or may be included in a reserved field of the EDID data. The information of the second upscaler 21 may have, but not limited to, a size of 1 byte through 10 bytes.

When the information of the second upscaler 21 is received, the content providing device 10 may selectively transmit the original image or the upscaling image to the display device 20, based on the information of the first upscaler 11 provided by the content providing device 10 and the information of the second upscaler 21 provided by the display device 20.

More specifically, in operation 705, the display device 20 may compare the received information of the first upscaler 11 with the previously stored information of the second upscaler 21 in the display device 20.

As a comparison result, when the content providing device 10 determines that the capabilities of the second upscaler 21 are superior to the capabilities of the first upscaler 11 in operation 707, the content providing device 10 may transmit the original image to the display device 20 in operation 709. The content providing device 10 may provide additional information indicating that the image provided by the content providing device 10 is the original image.

On the other hand, when the content providing device 10 determines that the capabilities of the first upscaler 11 are superior to the capabilities of the second upscaler 21 in operation 707, the content providing device 10 may perform upscaling on the original image by using the first upscaler 11, in operation 711. Once upscaling is performed on the original image, the content providing device 10 may transmit the first upscaling image to the display device 20, in operation 713. The content providing device 10 may provide additional information indicating that the image provided by the content providing device 10 is the first upscaling image.

In operations 715 through 721, when the original image is received, the display device 20 may perform upscaling on the original image by using the second upscaler 21 and display the second upscaling image resulting from upscaling. On the other hand, when the first upscaling image is received, the display device 20 may skip upscaling using the second upscaler 21 with respect to the first upscaling image, and display the received first upscaling image. Operations 715 through 721 may correspond to operations 307 through 313.

According to an embodiment, when the content providing device 10 receives the identification information of the second upscaler 21 in operation 703 of FIG. 7, the content providing device 10 may transmit the identification information of the second upscaler 21 to the upscaler management server 30 in operation 704-1. The upscaler management server 30 may search for the capability information of the second upscaler 21, based on the identification information of the second upscaler 21. In operation 704-2, the upscaler management server 30 may transmit the capability information of the second upscaler 21 corresponding to the identification information of the second upscaler 21 to the content providing device 10. Accordingly, in operations 705 and 707, the content providing device 10 may compare the received capability information of the second upscaler 21 with previously stored capability information of the first upscaler 11 in the content providing device 10, to determine an upscaler having superior capabilities.

In another embodiment, when the content providing device 10 receives the identification information of the second upscaler 21 in operation 703 of FIG. 7, the content providing device 10 may transmit the identification information of the second upscaler 21 and the identification information of the first upscaler 11 to the upscaler management server 30. The upscaler management server 30 may search for the capability information of the second upscaler 21 and the capability information of the first upscaler 11 and transmit the respective capability information corresponding to the identification information of the first upscaler 11 and the second upscaler 21 to the content providing device 10, based on the identification information of the second upscaler 21 and the identification information of the first upscaler 11. In this case, in operations 705 and 707, the content providing device 10 may compare the received capability information of the second upscaler 21 with the received capability information of the first upscaler 11 to determine an upscaler having superior capabilities.

Figure 8:
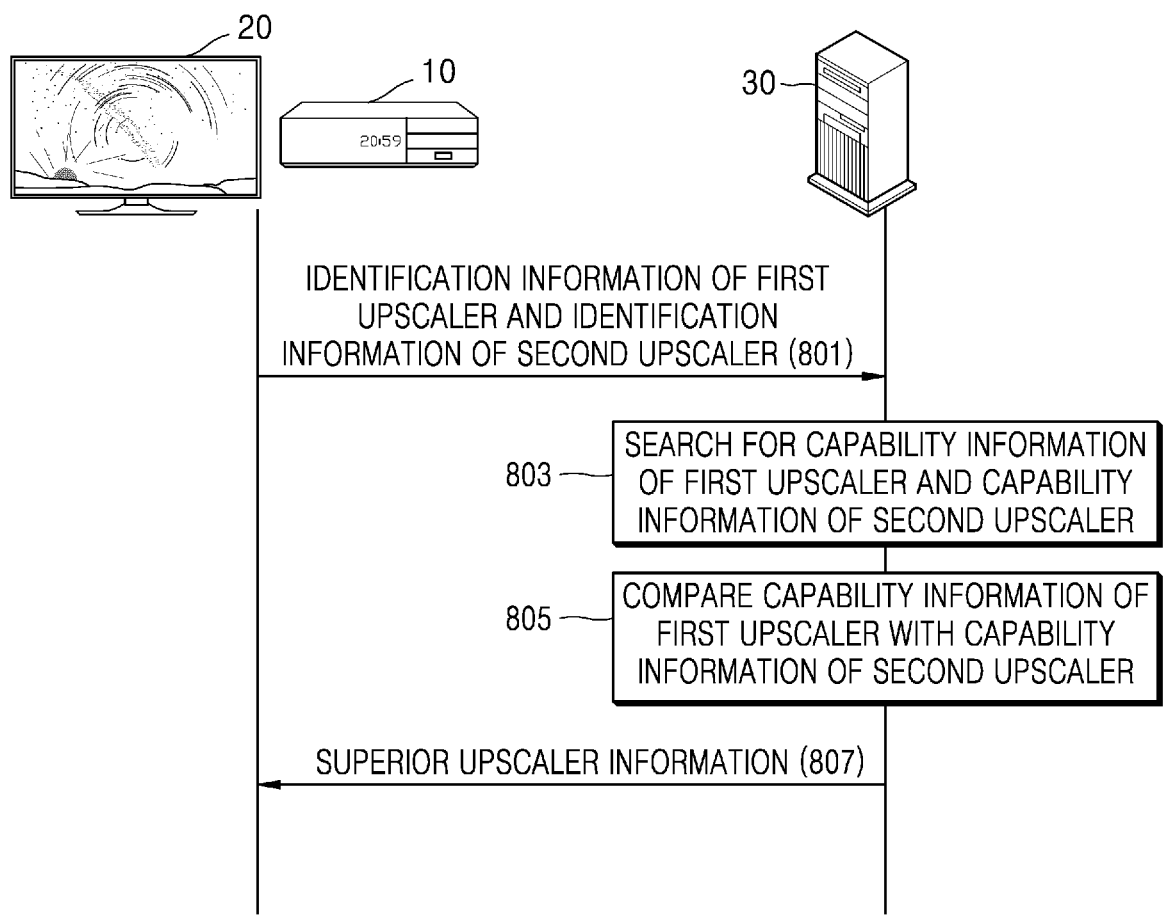
FIG. 8 is a flowchart illustrating an operation of a system according to another embodiment.

FIG. 8 is a flowchart illustrating an operation of a system, according to another embodiment.

An operation of comparing capabilities of the first upscaler 11 with capabilities of the second upscaler 21 may be performed by the upscaler management server 30.

In operation 801 of FIG. 8, at least one of the display device 20 or the content providing device 10 may transmit at least one of the identification information of the first upscaler 11 or the identification information of the second upscaler 21 to the upscaler management server 30.

For example, in operation 604-1 of FIG. 6, the display device 20 may transmit at least one of the identification information of the first upscaler 11 or the identification information of the second upscaler 21 to the upscaler management server 30. In operation 704-1 of FIG. 7, the content providing device 10 may transmit at least one of the identification information of the first upscaler 11 or the identification information of the second upscaler 21 to the upscaler management server 30.

In another example, when the content providing device 10 may transmit the identification information of the first upscaler 11 to the upscaler management server 30, the display device 20 may also transmit the identification information of the second upscaler 21 to the upscaler management server 30.

In operation 803, the upscaler management server 30 may search for the capability information of the first upscaler 11 and the capability information of the second upscaler 21, based on the received identification information of the first upscaler 11 and the received identification information of the second upscaler 21. In operation 805, the upscaler management server 30 may compare the capability information of the first upscaler 11 with the capability information of the second upscaler 21, and determine that one of the first upscaler 11 and the second upscaler 21 has a superior capability.

In operation 807, the upscaler management server 30 may transmit superior upscaler information as the determined information to at least one of the display device 20 or the content providing device 10.

The display device 20 or the content providing device 10 having received the superior upscaler information may perform upscaling on the original image, based on the received upscaler information.

For example, the display device 20 may perform an upscaling using the second upscaler 21, based on information of the superior upscaler received from the upscaler management server 30, in operation 807, and perform operations corresponding to operations 609 through 623 in FIG. 6.

Alternatively, the content providing device 10 may perform an upscaling using the first upscaler 11, based on information of the superior upscaler received from the upscaler management server 30 and perform operations corresponding to operations 709 through 721 in FIG. 7.

Figure 9:
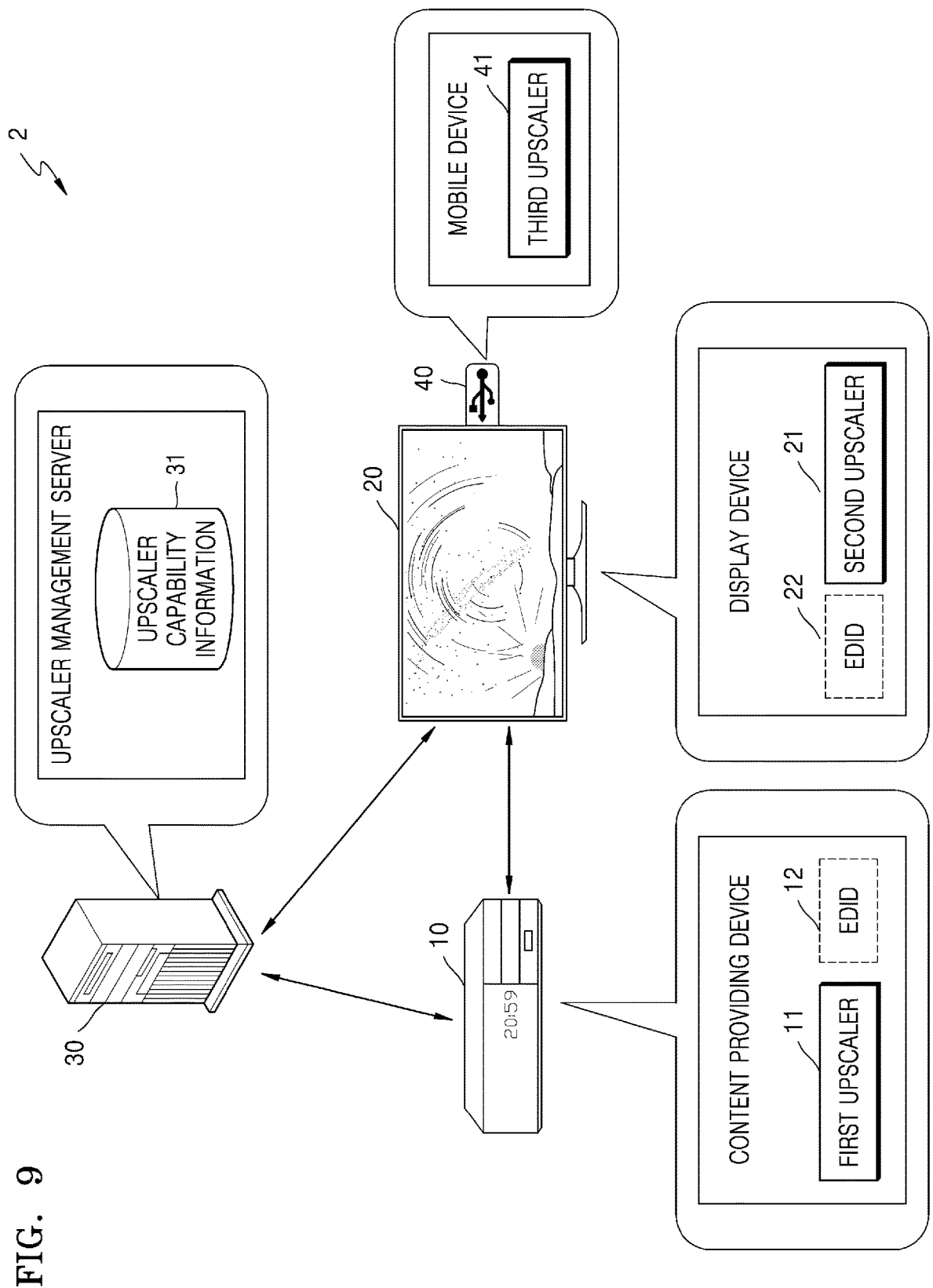
FIG. 9 schematically illustrates a system according to another embodiment.

FIG. 9 schematically illustrates a system according to another embodiment.

In FIG. 9, a system 2 may include the display device 20, the content providing device 10, the upscaler management server 30, and a mobile device 40 according to an embodiment.

The display device 20, the content providing device 10, and the upscaler management server 30 of FIG. 9 may correspond to the display device 20, the content providing device 10, and the upscaler management server 30 of FIG. 3.

The mobile device 40 may be connected to a port of the display device 20 to perform communication in a wireless or wired communication manner. The wired communication may include, for example, at least one of a universal serial bus (USB), a High Definition Multimedia Interface (HDMI), a Recommended Standard (RS)-232, or a Plain Old Telephone Service (POTS). The mobile device 40 may include, for example, but not limited to, a mobile disk device, a memory stick device, a dongle device, etc.

The mobile device 40 may include a communication circuit, a memory, and a processor.

The communication circuit (or the communication unit) of the mobile device 40 may perform communication with the display device 20 or the content providing device 10 in a wired or wireless communication manner under control of the processor.

The processor of the mobile device 40 may control overall operations of the mobile device 40. For example, the processor of the mobile device 40 may copy various software programs or instructions stored in a memory of the mobile device 40 to a RAM and execute the software programs or instructions to perform various operations. The processor 2100 may include at least one of a CPU chip, an application processor (AP) chip, a GPU chip, an audio chip, or an AI chip.

According to an embodiment, the processor of the mobile device 40 may set up communication connection with the display device 20 through the communication circuit. The processor of the mobile device 40 may control the communication circuit to receive the original image from the display device 20. The processor of the mobile device 40 may perform upscaling on the received original image by using a third upscaler provided by the mobile device 40. The processor of the mobile device 40 may transmit a third upscaling image resulting from upscaling to the display device 20. The original image may be an image received by the display device 20 from the content providing device 10 communication-connected with the display device 20.

Figure 10:
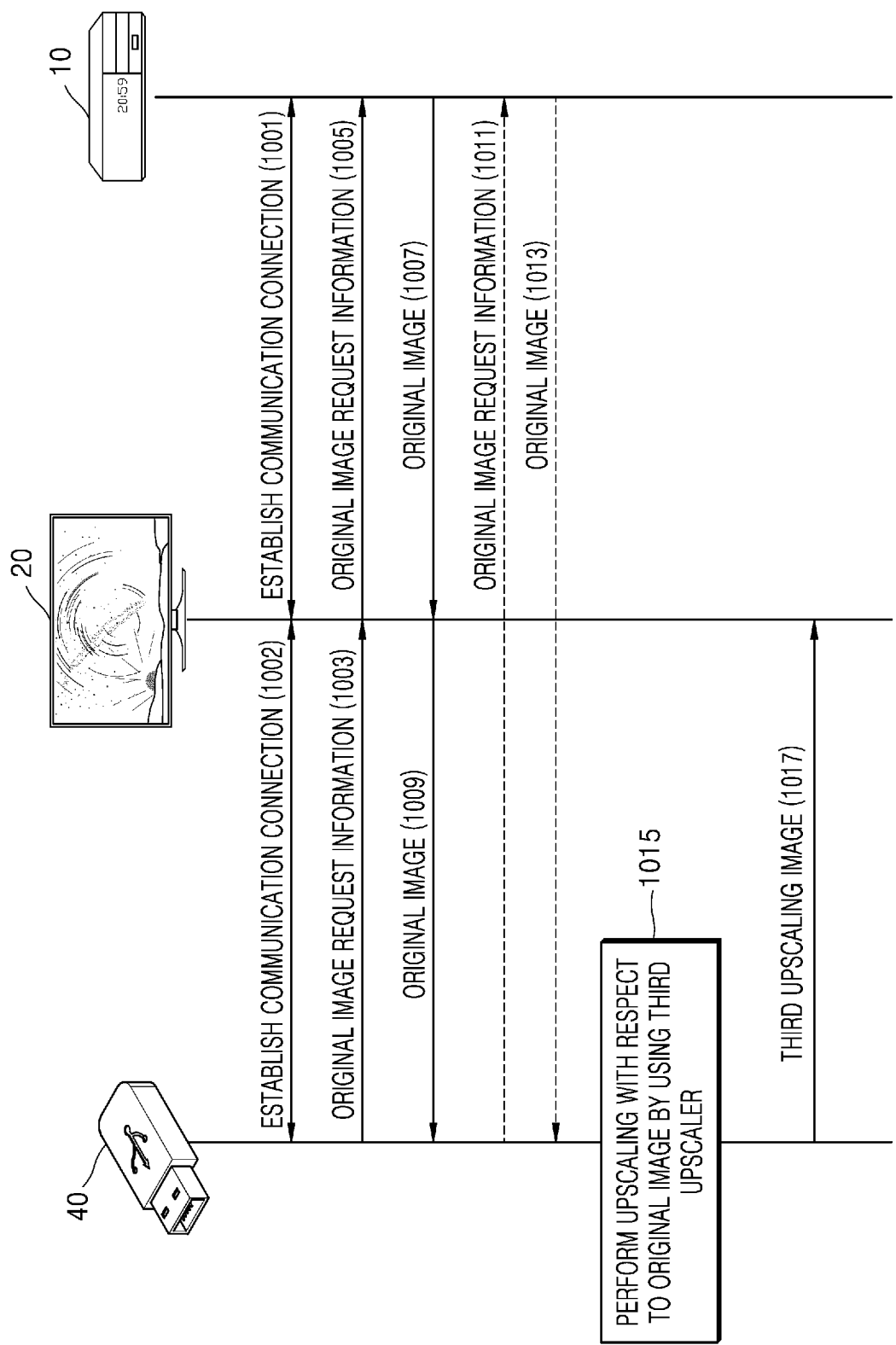
FIG. 10 is a flowchart illustrating an operation of a system according to an embodiment.

FIG. 10 is a flowchart illustrating an operation of the system 2, according to another embodiment.

In operation 1001, communication connection may be established between the content providing device 10 and the display device 20. The operation 1001 of establishing communication connection may correspond to the operation 301 of FIG. 3. In operation 1002, communication connection may be established between the display device 20 and the mobile device 40 through a wired/wireless network. For example, communication connection may be set up between the display device 20 and the mobile device 40 in a wired communication manner such as a USB, an HDMI, etc.

Once communication connection is established, the mobile device 40 may transmit original image request information requesting the original image to the display device 20 in operation 1003, and the display device 20 may deliver the original image request information requesting the original image to the content providing device 10 in operation 1005.

When the content providing device 10 transmits the original image to the display device 20 based on the original image request information in operation 1007, the display device 20 may deliver the received original image to the mobile device 40 in operation 1009.

In another embodiment, the mobile device 40 may directly transmit the original image request information to the content providing device 10 in operation 1011, and may receive the original image from the content providing device 10 in operation 1013.

The mobile device 40 having received the original image in operation 1009 or 1013 may perform upscaling on the received original image by using the third upscaler 41 provided by the mobile device 40 in operation 1015. In operation 1017, the mobile device 40 may transmit a third upscaling image resulting from upscaling to the display device 20.

Figure 11:
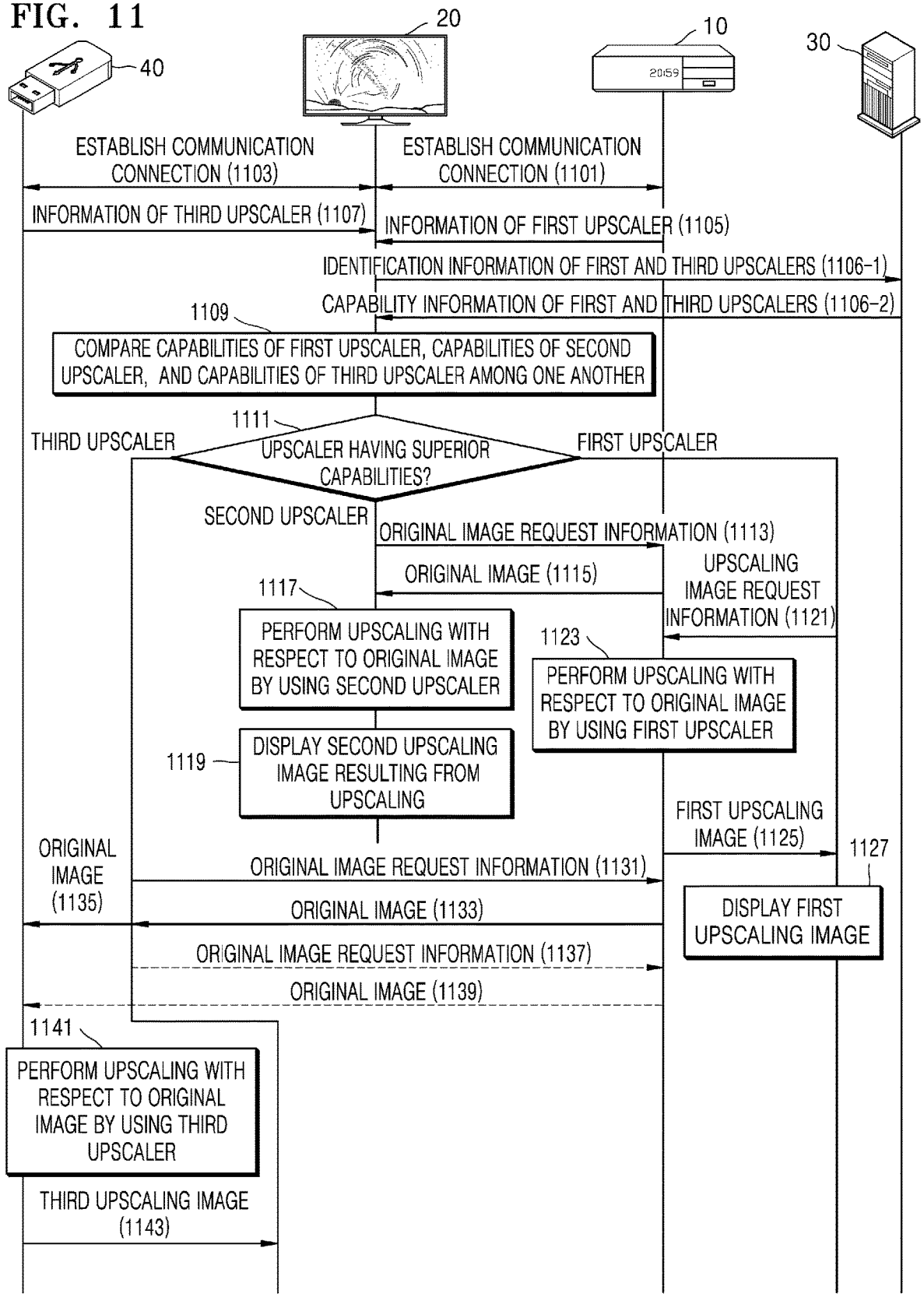
FIG. 11 is a flowchart illustrating an operation of a system according to another embodiment.

FIG. 11 is a flowchart illustrating an operation of the system 2, according to another embodiment.

In FIG. 11, operations 1101 and 1103 of establishing communication connection may correspond to operations 1001 and 1002 of FIG. 10.

When communication connection is established, the content providing device 10 may transmit information of the first upscaler 11 to the display device 20. The information of the first upscaler 11 may include at least one of identification information of the first upscaler 11 or capability information of the first upscaler 11.

In operation 1107, the mobile device 40 may transmit information of the third upscaler 41, provided by the mobile device 40, to the display device 20. The mobile device 40 may transmit information of the third upscaler 41 and transmit the information of the third upscaler 41 through the EDID data, based on a request message of the display device 20.

When the display device 20 receives the information of the first upscaler 11 and the information of the third upscaler 41, the display device 20 may compare capabilities of the first upscaler 11, capabilities of the third upscaler 41, and capabilities of the second upscaler 21 provided by the display device 20 among one another, in operation 1109.

In operation 1111, the display device 20 may determine an upscaler having superior capabilities based on a comparison result.

When the display device 20 determines that the capabilities of the second upscaler 21 are the most superior in operation 1111, the display device 20 may receive the original image from the content providing device 10 to perform upscaling on the original image by using the second upscaler 21, and display the second upscaling image resulting from upscaling in operations 1113 through 1119. These operations may correspond to operations 507 through 513.

On the other hand, when the display device 20 determines that the capabilities of the first upscaler 11 are the most superior in operation 1111, the display device 20 may receive the first upscaling image resulting from upscaling from the content providing device 10 and display the first upscaling image in operations 1121 through 1127. These operations may correspond to operations 515 through 521.

On the other hand, when the display device 20 determines that the capabilities of the third upscaler 41 are most superior in operation 1113, the display device 20 may transmit a request for the original image to the content providing device 10 and receive the original image from the content providing device 10, and deliver the original image to the mobile device 40 in operations 1131 through 1133.

In another embodiment, the mobile device 40 may directly transmit the original image request information to the content providing device 10 in operation 1137, and may receive the original image from the content providing device 10 in operation 1139.

The mobile device 40 having received the original image in operation 1135 or 1139 may perform upscaling on the received original image by using the third upscaler 41 provided by the mobile device 40 in operation 1141. In operation 1143, the mobile device 40 may transmit a third upscaling image to the display device 20 or the content providing device 10.

According to an embodiment, in operation 1106-1, the display device 20 may transmit the identification information of the first upscaler 11 and the identification information of the third upscaler 41 to the upscaler management server 30. The upscaler management server 30 may search for the capability information of the first upscaler 11 and the capability information of the third upscaler 41, based on the identification information of the first upscaler 11 and the identification information of the third upscaler 41. In operation 1106-2, the upscaler management server 30 may transmit the respective capability information of the first upscaler 11 and capability information of the third upscaler 41 to the display device 20. Accordingly, in operations 1109 and 1111, the display device 20 may compare the capability information of the first upscaler 11, the capability information of the second upscaler 21, and the capability information of the third upscaler 41 to determine an upscaler having superior capabilities.

In another embodiment, the display device 20 may transmit the identification information of the first upscaler 11, the identification information of the second upscaler 21, and the identification information of the third upscaler 41 to the upscaler management server 30. The upscaler management server 30 may search for the capability information of the first upscaler 11, the capability information of the second upscaler 21, and the capability information of the third upscaler 41 and transmit the respective capability information to the display device 20, based on the identification information of the first upscaler 11, the identification information of the second upscaler 21, and the identification information of the third upscaler 41. As such, in operations 1109 and 1111, the display device 20 may compare the capability information of the first upscaler 11, the capability information of the second upscaler 21, and the capability information of the third upscaler 41 among one another to determine an upscaler having superior capabilities.

Figure 12:
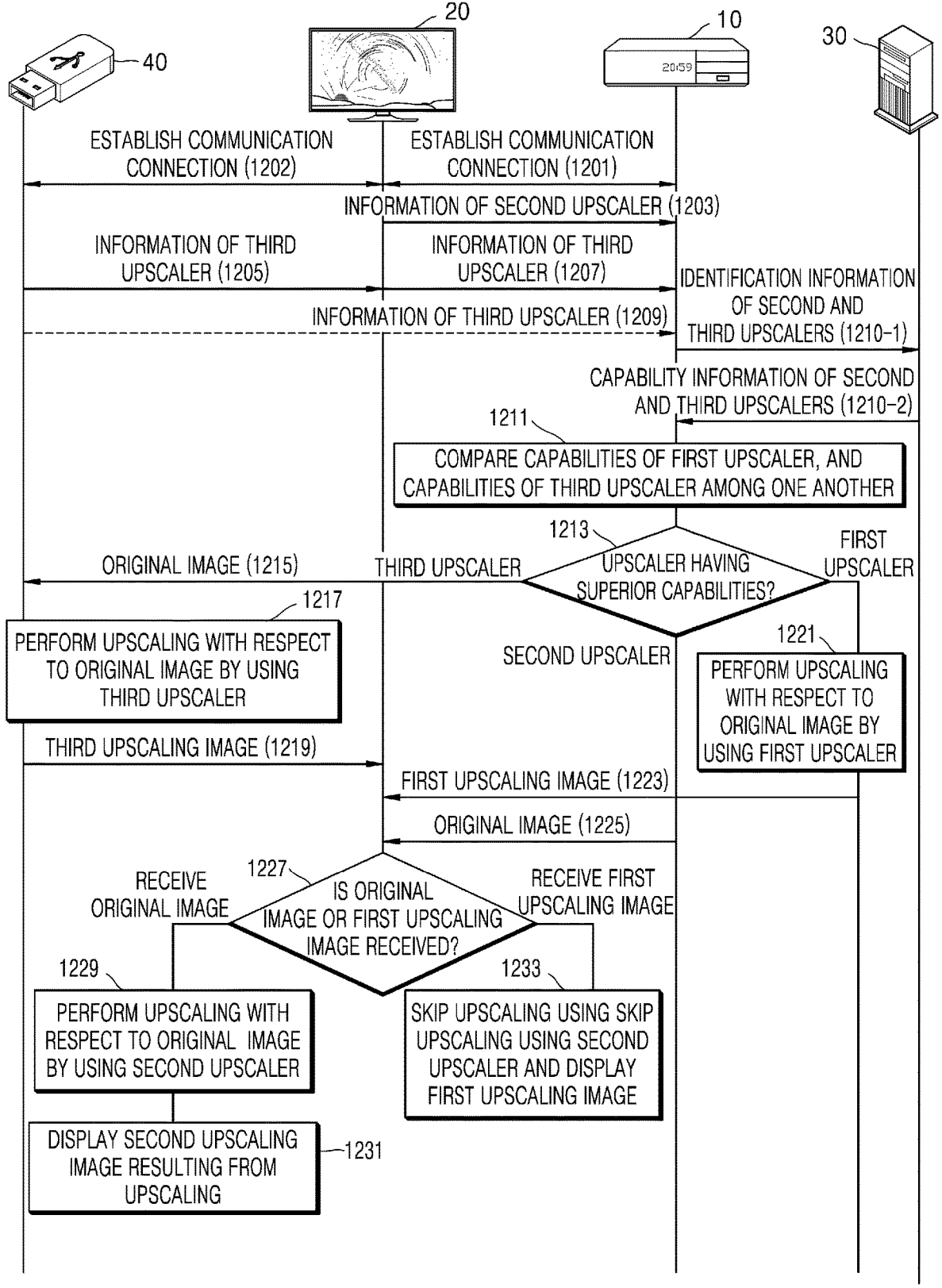
FIG. 12 is a flowchart illustrating an operation of a system according to another embodiment.

FIG. 12 is a flowchart illustrating an operation of the system 2, according to another embodiment.

In FIG. 12, operations 1201 and 1202 of establishing communication connection may correspond to operations 1001 and 1002 of FIG. 10.

When communication connection is established, the content providing device 10 may receive information of the second upscaler 21, provided by the display device 20, from the display device 20.

In operations 1205 and 1207, the content providing device 10 may receive the information of the third upscaler 41, provided by the mobile device 40, through the display device 20. In another example, in operation 1209, the content providing device 10 may directly receive the information of the third upscaler 41 from the mobile device 40.

When the content providing device 10 receives the information of the second upscaler 21 and the information of the third upscaler 41, the content providing device 10 may compare the capabilities of the first upscaler 11, the capabilities of the third upscaler 41, and the capabilities of the second upscaler 21 provided by the display device 20 among one another, in operation 1211.

In operation 1213, the display device 20 may determine an upscaler having superior capabilities based on a comparison result.

When the content providing device 10 determines that the capabilities of the third upscaler 41 are the most superior in operation 1213, the content providing device 10 may transmit the original image to the mobile device 40 in operation 1215. The content providing device 10 may transmit the original image to the mobile device 40 through the display device 20.

In operation 1217, the mobile device 40 may perform upscaling on the received original image by using the third upscaler 41 provided by the mobile device 40. In operation 1219, the mobile device 40 may transmit a third upscaling image to the display device 20.

Alternatively, when the content providing device 10 determines that the capabilities of the first upscaler 11 are the most superior in operation 1213, the content providing device 10 may perform upscaling on the original image by using the first upscaler 11, in operation 1221. Once upscaling is performed on the original image, the content providing device 10 may transmit the first upscaling image resulting from upscaling to the display device 20, in operation 1223.

Alternatively, when the content providing device 10 determines that the capabilities of the second upscaler 21 are the most superior in operation 1213, the content providing device 10 may transmit the original image to the display device 20 in operation 1225.

In operations 1227 through 1233, when the original image is received, the display device 20 may perform upscaling on the original image by using the second upscaler 21 and display the second upscaling image resulting from upscaling. On the other hand, when the first upscaling image is received, the display device 20 may skip upscaling using the second upscaler 21 with respect to the first upscaling image, and display the received first upscaling image. Operations 1227 through 1233 may correspond to operations 307 through 313.

According to an embodiment, in operation 1210-1, the content providing device 10 may transmit the identification information of the second upscaler 21 and the identification information of the third upscaler 41 to the upscaler management server 30. The upscaler management server 30 may search for the capability information of the second upscaler 21 and the capability information of the third upscaler 41, based on the identification information of the second upscaler 21 and the identification information of the third upscaler 41. In operation 1210-2, the upscaler management server 30 may transmit the respective capability information of the second upscaler 21 and the third upscaler 41 corresponding to the identification information of the second upscaler 21 and the third upscaler 41, to the content providing device 10. Accordingly, in operations 1211 and 1213, the content providing device 10 may compare the capability information of the first upscaler 11, the capability information of the second upscaler 21, and the capability information of the third upscaler 41 among one another to determine an upscaler having superior capabilities.

In another embodiment, the content providing device 10 may transmit the identification information of the first upscaler 11, the identification information of the second upscaler 21, and the identification information of the third upscaler 41 to the upscaler management server 30. The upscaler management server 30 may search for the capability information of the first upscaler 11, the capability information of the second upscaler 21, and the capability information of the third upscaler 41 and transmit the respective capability information to the content providing device 10, based on the identification information of the first upscaler 11, the identification information of the second upscaler 21, and the identification information of the third upscaler 41. As such, in operations 1211 and 1213, the content providing device 10 may compare the capability information of the first upscaler 11, the capability information of the second upscaler 21, and the capability information of the third upscaler 41 among one another to determine an upscaler having superior capabilities.

Figure 13:
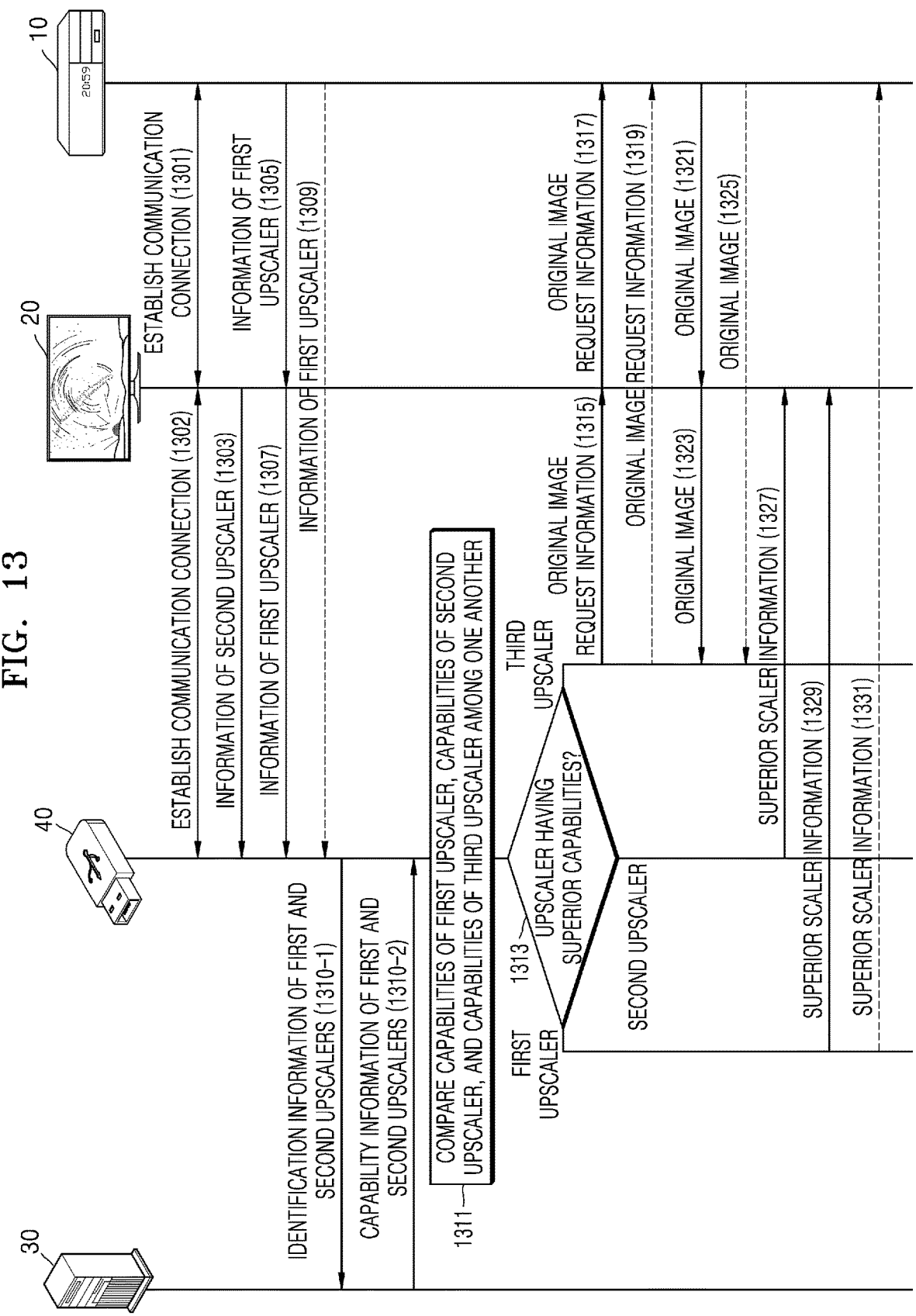
FIG. 13 is a flowchart illustrating an operation of a system according to another embodiment.

FIG. 13 is a flowchart illustrating an operation of the system 2, according to another embodiment.

In FIG. 13, operations 1301 and 1302 of establishing communication connection may correspond to operations 1001 and 1002 of FIG. 10.

When communication connection is established, the mobile device 40 may receive information of the second upscaler 21, provided by the display device 20, from the display device 20, in operation 1303.

In operations 1305 and 1307, the mobile device 40 may receive the information of the second upscaler 21, provided by the content providing device 10, through the display device 20. In another example, in operation 1309, the content providing device 10 may directly receive the information of the first upscaler 11 from the content providing device 10.

When the content providing device 10 receives the information of the first upscaler 11 and the information of the second upscaler 21, the content providing device 10 may compare the capabilities of the first upscaler 11, the capabilities of the second upscaler 21, and the capabilities of the third upscaler 41 provided by the mobile device 40 among one another, in operation 1311.

In operation 1313, the display device 20 may determine an upscaler having superior capabilities based on a comparison result.

When the content providing device 10 determines that the capabilities of the third upscaler 41 are the most superior in operation 1313, the content providing device 10 may transmit original image request information to the display device 20 in operation 1315. In operation 1317, the display device 20 may transmit the original image request information to the content providing device 10. In another example, in operation 1319, the mobile device 40 may directly transmit the original image request information to the content providing device 10.

In operation 1321, the display device 20 may receive the original image, and in operation 1323, the display device 20 may deliver the received original image to the mobile device 40, based on the original image request information. Alternatively, in operation 1325, the mobile device 40 may directly receive the original image from the content providing device 10. The mobile device 40 may perform upscaling on the received original image by using the third upscaler 41 provided in the mobile device 40. The mobile device 40 may transmit a third upscaling image resulting from upscaling to the display device 20.

When the mobile device 40 determines that the capabilities of the second upscaler 21 are the most superior in operation 1313, the mobile device 40 may transmit superior upscaler information, indicating that the capabilities of the second upscaler 21 are the most superior, to the display device 20 in operation 1327. Accordingly, the display device 20 may receive the original image from the content providing device 10, perform upscaling on the received original image by using the second upscaler 21, and display the second upscaling image result from upscaling.

When the mobile device 40 determines that the capabilities of the first upscaler 11 are the most superior in operation 1313, the mobile device 40 may transmit superior upscaler information indicating that the capabilities of the first upscaler 11 are the most superior among other upscalers, to the display device 20 in operation 1329. Thus, the display device 20 may receive the first upscaling image resulting from upscaling from the content providing device 10, and display the first upscaling image. In another example, in operation 1331, the mobile device 40 may directly transmit the superior upscaler information indicating that the capabilities of the first upscaler 11 are the most superior, to the content providing device 10. Thus, when the content providing device 10 transmits the first upscaling image resulting from upscaling to the display device 20, the display device 20 may display the received first upscaling image.

According to an embodiment, in operation 1310-1, the mobile device 40 may transmit the identification information of the first upscaler 11 and the identification information of the second upscaler 21 to the upscaler management server 30. The upscaler management server 30 may search for the capability information of the first upscaler 11 and the capability information of the second upscaler 21, based on the identification information of the first upscaler 11 and the identification information of the second upscaler 21. In operation 1310-2, the upscaler management server 30 may transmit the respective capability information of the first upscaler 11 and capability information of the second upscaler 21 to the mobile device 40. Accordingly, in operations 1311 and 1313, the mobile device 40 may compare the capability information of the first upscaler 11, the capability information of the second upscaler 21, and the capability information of the third upscaler 41 among one another to determine an upscaler having superior capabilities.

In another embodiment, the mobile device 40 may transmit the identification information of the first upscaler 11, the identification information of the second upscaler 21, and the identification information of the third upscaler 41 to the upscaler management server 30. The upscaler management server 30 may search for the capability information of the first upscaler 11, the capability information of the second upscaler 21, and the capability information of the third upscaler 41 and transmit the respective capability information to the mobile device 40, based on the identification information of the first upscaler 11, the identification information of the second upscaler 21, and the identification information of the third upscaler 41. As such, in operations 1311 and 1313, the mobile device 40 may compare the capability information of the first upscaler 11, the capability information of the second upscaler 21, and the capability information of the third upscaler 41 among one another to determine an upscaler having superior capabilities.

Figure 14:
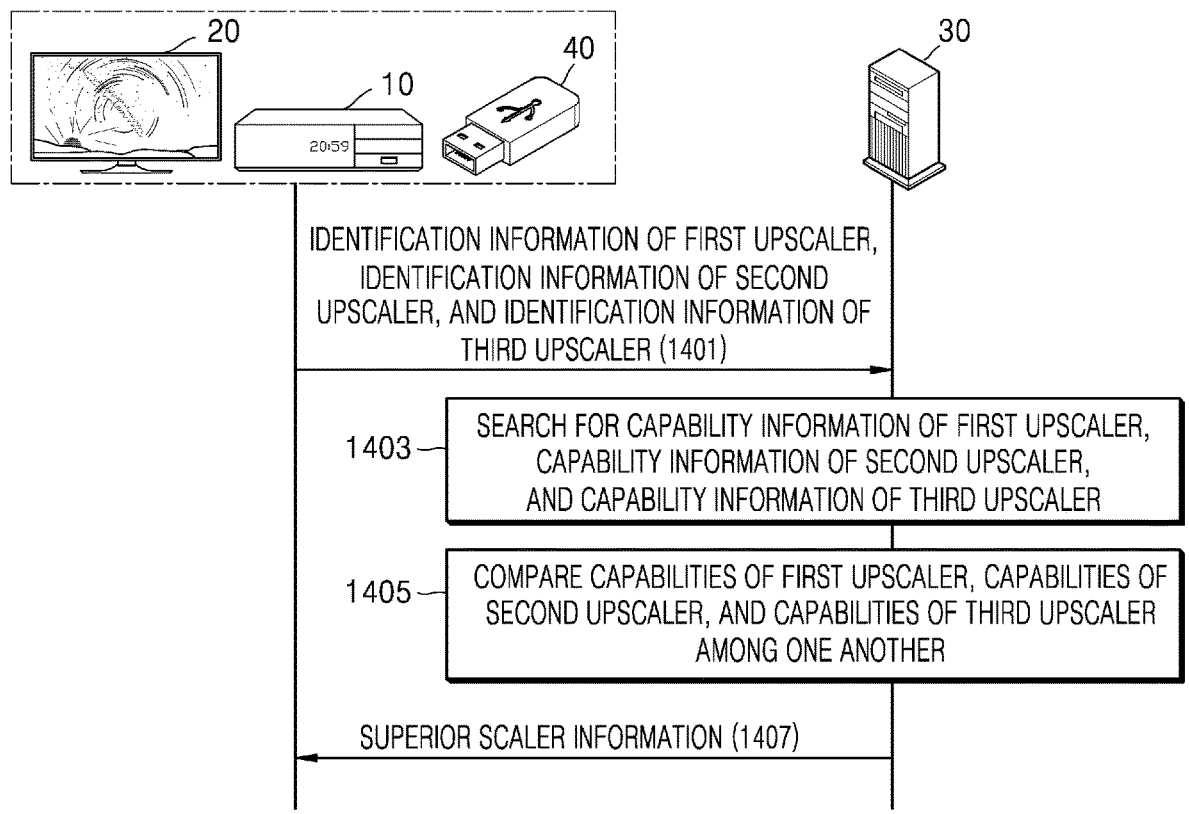
FIG. 14 is a flowchart illustrating an operation of a system according to another embodiment.

FIG. 14 is a flowchart illustrating an operation of a system, according to another embodiment.

In FIG. 14, an operation of comparing the capabilities of the first upscaler 11, the capabilities of the second upscaler 21, and the capabilities of the third upscaler 41 among one another may be performed by the upscaler management server 30.

In operation 1401 of FIG. 14, at least one of the display device 20, the content providing device 10, or the mobile device 40 may transmit at least one of the identification information of the first upscaler 11, the identification information of the second upscaler 21, or the identification of the third upscaler 41 to the upscaler management server 30.

For example, in operation 1106-1 of FIG. 11, the display device 20 may transmit at least one of the identification information of the first upscaler 11 or the identification information of the third upscaler 41 to the upscaler management server 30. In operation 1210-1 of FIG. 12, the content providing device 10 may transmit at least one of the identification information of the first upscaler 11 or the identification information of the third upscaler 41 to the upscaler management server 30. In operation 1310-1 of FIG. 13, the mobile device 40 may transmit at least one of the identification information of the first upscaler 11 or the identification information of the second upscaler 21 to the upscaler management server 30.

In operation 1403, the upscaler management server 30 may search for the capability information of the first upscaler 11, the capability information of the second upscaler 21, and the capability information of the third upscaler 41 based on the received identification information of the first upscaler 11, the second upscaler 21, and the third upscaler 41. In operation 1405, the upscaler management server 30 may compare capability information of the first upscaler 11, capability information of the second upscaler 21, and capability information of the third upscaler 41 among one another, and determine one of the first upscaler 11, the second upscaler 21, and the third upscaler 41 having the most superior capabilities.

In operation 1407, the upscaler management server 30 may transmit superior upscaler information as the determined information to at least one of the display device 20, the content providing device 10, or the mobile device 40.

The display device 20, the content providing device 10, or the mobile device 40 having received the superior upscaler information may perform upscaling on the original image, based on the received upscaler information.

Figure 15:
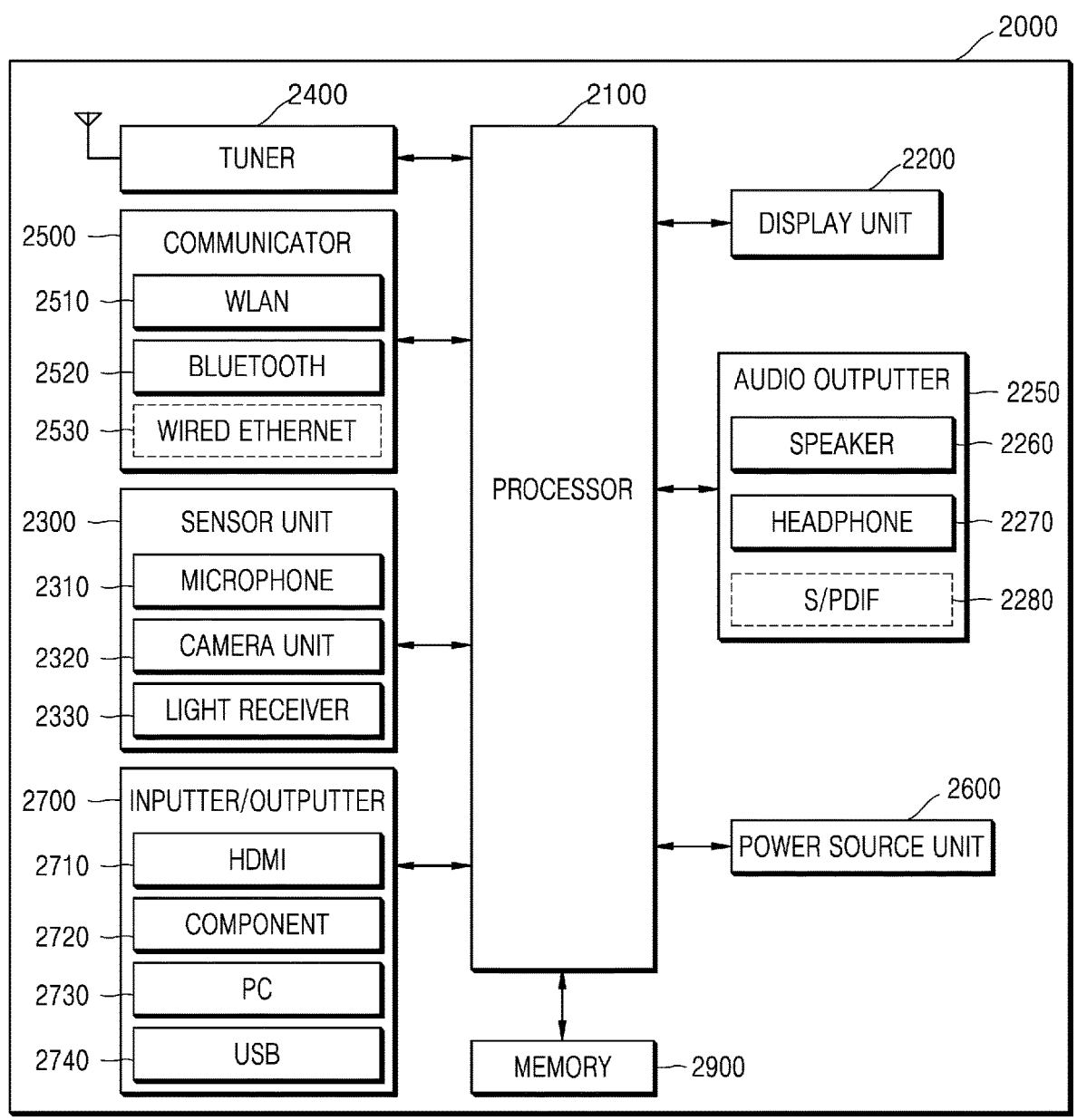
FIG. 15 is a block diagram of a partial structure of a display device, according to another embodiment.

FIG. 15 is a block diagram of a partial structure of a display device, according to another embodiment.

A display device 2000 shown in FIG. 15 may be an example of the display device 20 shown in FIGS. 1 and 9. The display device 2000 may include a tuner unit 2400, a processor 2100, a display unit 2200, a communicator 2500, a sensor unit 2300, an inputter/outputter 2700, a memory 2900, an audio outputter 2250, and a power source unit 2600.

The tuner unit (or tuner circuit) 2400 may select a frequency of a channel the display device 20 to receive from among many electric wave components by tuning the frequency through amplification, mixing, resonance, or the like on a broadcast signal received wiredly or wirelessly. The broadcast signal may include audio, video, and additional information (for example, an electronic program guide (EPG)).

The tuner unit 2400 may receive a broadcast signal in a frequency band corresponding to a channel number based on a user input (for example, a control signal received from a control device, such as a channel number input, a channel up-down input, and a channel input on an EPG screen).

The tuner unit 2400 may receive a broadcast signal from various sources such as terrestrial broadcasting, cable broadcasting, satellite broadcasting, Internet broadcasting, and so forth. The tuner unit 2400 may receive a broadcast signal from a source such as analog broadcasting, digital broadcasting, or the like.

The communicator (or communication circuit) 2500 may transmit and receive data or a signal from an external device (e.g., a control device, a peripheral device, etc.) under control of the processor 2100.

The communicator 2500 may transmit and receive data or a signal by using at least one of a wireless local area network (WLAN) (for example, Wireless Fidelity (Wi-Fi), Bluetooth, wired Ethernet, infrared (IR), Bluetooth Low Energy (BLE), ultrasonic waves, ZigBee, a high definition multimedia interface (HDMI), a cellular network, Internet, or a computer network, according to capability and structure of the display device 20.

In an embodiment, the communicator 2500 may transmit and receive data or a signal with the content providing device 10. The communicator 2500 may transmit and receive data or a signal with the content providing device 10 by using wireless communication such as Bluetooth, BLE, Zigbee, WiFi, etc. The communicator 2500 may transmit and receive data or a signal with the upscaler management server 30 through a long-distance communication network such as a cellular network, Internet, or a computer network (e.g., a LAN or a WAN).

The communicator 2500 may receive a control command for controlling an operation of the display device 20 from a control device (e.g., a remote controller), and the processor 2100 may perform the operation according to the control command.

The processor 2100 may control overall operations of the display device 20. In another example, the processor 2100 may copy various software programs or instructions stored in the memory 2900 to a random access memory (RAM) and execute the programs or instructions to perform various operations. The processor 2100 may execute an operating system (OS) and various applications stored in the memory 2900, when a user input is input or a preset and stored condition is satisfied.

The processor 2100 may include at least one of a CPU chip, an application processor (AP) chip, a GPU chip, an audio chip, or an AI chip.

For example, the processor 2100 may perform image processing. The processor 2100 may perform quality processing, such as, decoding or upscaling an image.

In another example, the processor 2100 may perform audio processing. The processor 2100 may perform various processing such as decoding, amplification, noise filtering, etc., on audio data.

In another example, the processor 2100 may control the communicator 2500 to establish communication connection with the content providing device 10. The processor 2100 may control the communicator 2500 to transmit to the content providing device 10, image request information for requesting the content providing device 10 to selectively transmit the original image or an upscaling image. The processor 2100 may control the communicator 2500 to receive the original image or the first upscaling image resulting from upscaling using the first upscaler 11 from the content providing device 10 based on the image request information. Upon receiving the original image, the processor 2100 may perform upscaling on the original image by using the second upscaler 21, and control the display unit 2200 to display a second upscaling image. Upon receiving the first upscaling image, the processor 2100 may skip upscaling using the second upscaler 21, and control the display unit 2200 to display the first upscaling image.

The sensor unit 2300 may sense or detect a user's voice, a user's image, or a user's interaction, and may include a microphone 2310, a camera unit 2320, and a light receiver 2330.

The microphone 2310 may receive an uttered voice of the user. The microphone 2310 converts the received voice into an electric signal and outputs the electric signal to the processor 2100. The user's voice may include, for example, a voice corresponding to a menu or a function of the display device 20.

The camera unit 2320 may capture an image (e.g., a continuous frame) corresponding to a user's motion including a gesture in a camera recognition range. The processor 2100 may select a menu displayed on the display device 20 by using a recognition result of a captured motion or perform control corresponding to the recognition result of the captured motion.

The light receiver 2330 may receive a light signal (including a control signal) received from an external control device through a lighting window of a bezel of the display device 20. The light receiver 2330 may receive a light signal corresponding to a user input (e.g., a touch, a press, a touch gesture, a voice, or a motion) from a control device. A control signal may be extracted from the received light signal under control of the processor 2100.

The inputter/outputter 2700 may receive video (e.g., moving images, etc.), audio (e.g., a voice, music, etc.), and additional information (e.g., an EPG, etc.) from an external device outside the display device 20 (e.g., the content providing device 10), under control of the processor 2100. The inputter/outputter 2700 may include one of an HDMI port 2710, a component jack 2720, a PC port 2730, and a USB port 2740. The inputter/outputter 2700 may include a combination of the HDMI port 2710, the component jack 2720, the PC port 2730, and the USB port 2740.

The display unit 2200 may convert an image signal, a data signal, an on-screen display (OSD) signal, a control signal, or the like, processed by the processor 2100, to generate a driving signal. The display unit 2200 may be implemented with a plasma display panel (PDP), a liquid crystal display (LCD), an organic light-emitting diode (OLED), a flexible display, or the like, and may also be implemented with a three-dimensional (3D) display. The display unit 2200 may include a touch screen and thus may be used as an input device as well as an output device.

The audio outputter 2250 outputs audio included in a broadcast signal received through the tuner unit 2400 under control of the processor 2100. The audio outputter 2250 outputs audio (e.g., voice, sound, etc.) input through the communicator 2500 or the inputter/outputter 2700. The audio outputter 2250 outputs audio stored in the memory 2900 under control of the processor 2100. The audio outputter 2250 may include at least one of a speaker 2260, a headphone output terminal 2270, or a Sony/Phillips digital interface (S/PDIF) output terminal 2280.

The power source unit 2600 may supply power, which is input from an external power source, to the internal elements of the display device 20, under control of the processor 2100. The power source unit 2600 supplies power, which is output from one or more batteries included in the display device 20, to the internal elements, under control of the processor 2100.

The memory 2900 may store various data, programs, or applications for driving and controlling the display device 20 under control of the processor 2100. The memory 2900 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs (not shown) of the memory 2900 may be implemented in the form of software to perform a control function of broadcasting reception, a channel control function, a volume control function, a communication control function, a voice recognition function, a motion recognition function, a light reception control function, a power control function, or a power control function of an external device connected wirelessly (e.g., by Bluetooth) in the display device 20. The memory 2900 may store EDID data and upscaler information. In addition, the memory 2900 may store a neural model required for upscaling.

Furthermore, the memory 2900 may store at least one instruction configured to cause the display device 20 to establish communication connection with the content providing device 10, to transmit to the content providing device 10, image request information requesting the content providing device 10 to selectively transmit an original image or an upscaling image, to receive the original image or a first upscaling image resulting from upscaling using a first upscaler from the content providing device, based on the image request information, upon receiving the original image, to perform upscaling on the original image by using a second upscaler and display a second upscaling image resulting from upscaling, and upon receiving the first upscaling image, to skip upscaling using the second upscaler with respect to the first upscaling image and display the first upscaling image.

The block diagram of the display device 20 shown in FIG. 15 is merely a block diagram for an embodiment, and the embodiment is not limited thereto. Elements of the block diagram may be integrated, added, or omitted depending on the needs of the display device 20. That is, when necessary, two or more elements may be integrated into one element or one element may be divided into two or more elements. A function executed in each element (or module) is intended to describe embodiments, and a detailed operation or apparatus thereof does not limit the scope of the disclosure.

The operation method of the display device 20 according to an embodiment may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments herein or a program command known to be used by those skilled in the art. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program commands include a machine language code created by a complier and a high-level language code executable by a computer using an interpreter.

The operation method of the display device 20 according to embodiments may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the display device 20 or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include a S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

According to an embodiment, a display device and a content providing device may each include an upscaler, and the upscaler having optimal capabilities may be selected to perform upscaling on the original image.

Thus, the quality of an upscaling image may be improved, such that a watching experience of a user using the display device may be remarkably improved. In particular, when information for selecting an upscaler is transmitted and received using an existing EDID data format, the efficiency of communication between the display device and the content providing device may be enhanced.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

What is claimed is:
1. A method of displaying an image in a display device, the method comprising:
receiving information of a first upscaler from a content providing device;
transmitting, to the content providing device, image request information requesting the content providing device to selectively transmit an image of a first resolution or an image of a second resolution, the image request information being based on the information of the first upscaler of the content providing device and information of a second upscaler of the display device;
receiving the image of the first resolution or the image of the second resolution which is obtained by performing upscaling on the image of the first resolution using the first upscaler of the content providing device, based on the image request information;
based on receiving the image of the first resolution, performing upscaling on the image of the first resolution using the second upscaler of the display device to obtain an upscaled image having the second resolution and displaying the upscaled image having the second resolution, an upscaling capability of the second upscaler being different from an upscaling capability of the first upscaler; and
based on receiving the image of the second resolution, displaying the image of the second resolution,
wherein each of the information of the first upscaler and the information of the second upscaler comprises at least one of identification information and capability information.

2. The method of claim 1, wherein the transmitting of the image request information to the content providing device, based on the information of the first upscaler and the information of the second upscaler, comprises:
based on determining that the upscaling capability of the second upscaler is superior to the upscaling capability of the first upscaler, transmitting, to the content providing device, the image request information requesting the image of the first resolution; and
based on determining that the upscaling capability of the first upscaler is superior to the upscaling capability of the second upscaler, transmitting, to the content providing device, the image request information requesting the image of the second resolution.

3. The method of claim 1, further comprising:
transmitting the identification information of the first upscaler to an external server; and
receiving the capability information of the first upscaler from the external server,
wherein the transmitting of the image request information to the content providing device comprises transmitting the image request information based on the received capability information of the first upscaler and the capability information of the second upscaler.

4. The method of claim 1, further comprising determining whether a received image is the image of the first resolution or the image of the second resolution based on at least one attribute information of the received image, the at least one attribute information comprising a volume of the received image, a resolution of the received image, and an additional information of the received image.

5. The method of claim 1, wherein the transmitting of the image request information to the content providing device further comprises:
receiving, from the content providing device, upscaling determination information determining whether the image of the first resolution is required; and based on the received upscaling determination information, transmitting, to the content providing device, the image request information requesting the image of the first resolution.

6. The method of claim 1, further comprising, based on receiving the image of the first resolution, performing a quality processing on the image of the first resolution.

7. The method of claim 1, wherein at least one of the first upscaler and the second upscaler performs upscaling on the image of the first resolution by using an artificial intelligence (AI) algorithm based on a neural network.

8. The method of claim 1, wherein the transmitting of the image request information to the content providing device further comprises transmitting the image request information included in extended display identification data (EDID) data that is image standard data, to the content providing device.

9. A display device comprising:
a communication circuit;
a display;
a memory storing one or more instructions; and
a processor configured to execute the one or more instructions to:
control the communication circuit to receive information of a first upscaler from a content providing device;
control the communication circuit to transmit, to the content providing device, image request information requesting the content providing device to selectively transmit an image of a first resolution or an image of a second resolution, the image request information being based on the information of the first upscaler of the content providing device and information of a second upscaler of the display device;
control the communication circuit to receive, from the content providing device, the image of the first resolution or the image of the second resolution which is obtained by performing upscaling on the image of the first resolution using the first upscaler of the content providing device;
based on receiving the image of the first resolution, perform upscaling on the image of the first resolution using the second upscaler of the display device to obtain an upscaled image having the second resolution and display the upscaled image having the second resolution, an upscaling capability of the second upscaler being different from an upscaling capability of the first upscaler; and
based on receiving the image of the second resolution, display the image of the second resolution,
wherein each of the information of the first upscaler and the information of the second upscaler comprises at least one of identification information and capability information.

10. The display device of claim 9, wherein the processor is further configured to execute the one or more instructions to:
based on determining that the upscaling capability of the second upscaler is superior to the upscaling capability of the first upscaler, control the communication circuit to transmit, to the content providing device, the image request information requesting the image of the first resolution; and
based on determining that the upscaling capability of the first upscaler is superior to the upscaling capability of the second upscaler, control the communication circuit to transmit, to the content providing device, the image request information requesting the image of the second resolution.

11. The display device of claim 9, wherein the processor is further configured to execute the one or more instructions to:
control the communication circuit to transmit identification information of the first upscaler to an external server;
control the communication circuit to receive the capability information of the first upscaler from the external server; and
control the communication circuit to transmit the image request information to the content providing device, based on the received capability information of the first upscaler and the capability information of the second upscaler.

12. The display device of claim 9, wherein the processor is further configured to execute the one or more instructions to determine whether a received image is the image of the first resolution or the image of the second resolution based on at least one attribute information of the received image, and
wherein the at least one attribute information comprises a volume of the received image, a resolution of the received image, and additional information of the received image.

13. The display device of claim 9, wherein the processor is further configured to execute the one or more instructions to:
receive, from the content providing device, upscaling determination information determining whether the image of the first resolution is required; and
based on the received upscaling determination information, control the communication circuit to transmit, to the content providing device, the image request information requesting the image of the first resolution.

14. The display device of claim 9, wherein at least one of the first upscaler and the second upscaler performs upscaling with respect to the image of the first resolution by using an artificial intelligence (AI) algorithm based on a neural network.

15. The display device of claim 9, wherein the processor is further configured to execute the one or more instructions to control the communication circuit to transmit the image request information included in extended display identification data (EDID) data that is image standard data, to the content providing device.

16. A computer program product including a non-transitory computer-readable recording medium having a program stored thereon to perform an operation method of a display device, the operation method comprising:
receiving information of a first upscaler from a content providing device;
transmitting, to the content providing device, image request information requesting the content providing device to selectively transmit an image of a first resolution or an image of a second resolution, the image request information being based on the information of the first upscaler of the content providing device and information of a second upscaler of the display device;
receiving the image of the first resolution or the image of the second resolution which is obtained by performing upscaling on the image of the first resolution using the first upscaler of the content providing device, based on the image request information;

based on receiving the image of the first resolution, performing upscaling on the image of the first resolution using the second upscaler of the display device to obtain an upscaled image having the second resolution and displaying the upscaled image having the second resolution, an upscaling capability of the second upscaler being different from an upscaling capability of the first upscaler; and based on receiving the image of the second resolution, displaying the image of the second resolution, wherein each of the information of the first upscaler and the information of the second upscaler comprises at least one of identification information and capability information.

\* \* \* \* \*